(12) United States Patent
Eto et al.

(10) Patent No.: US 8,692,926 B2
(45) Date of Patent: Apr. 8, 2014

(54) FOCUS ADJUSTMENT BASED ON INDICATOR OF RANDOMNESS OF PIXEL VALUES

(75) Inventors: Satoshi Eto, Yokohama (JP); Senshu Igarashi, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 526 days.

(21) Appl. No.: 12/938,994

(22) Filed: Nov. 3, 2010

(65) Prior Publication Data
US 2011/0122277 A1 May 26, 2011

(30) Foreign Application Priority Data
Nov. 26, 2009 (JP) .................................. 2009-268936

(51) Int. Cl.
*H04N 5/232* (2006.01)
*G03B 13/00* (2006.01)

(52) U.S. Cl.
USPC ........................................................ 348/345

(58) Field of Classification Search
USPC ........................................................ 348/345
See application file for complete search history.

(56) References Cited

U.S. PATENT DOCUMENTS

| | | | |
|---|---|---|---|
| 5,210,566 A | 5/1993 | Nishida | |
| 5,349,415 A | 9/1994 | Nishida | |
| 8,384,821 B2 * | 2/2013 | Takeda et al. | 348/353 |
| 2008/0024648 A1 * | 1/2008 | Yasuda | 348/345 |
| 2009/0148146 A1 * | 6/2009 | Maeda | 396/89 |

FOREIGN PATENT DOCUMENTS

| | | |
|---|---|---|
| JP | 04-2281 | 1/1992 |
| JP | 5-80248 A | 4/1993 |
| JP | 5-300421 A | 11/1993 |
| JP | 10-213737 | 8/1998 |
| JP | 2006-148300 | 6/2006 |
| JP | 2008-193514 A | 8/2008 |
| JP | 2009-139688 | 6/2009 |

OTHER PUBLICATIONS

Japanese Office Action in Japanese Patent Appliction No. 2009-268936, drafting date Jun. 3, 2013.
Japanese Office Action in Japanese Patent Appliction No. 2009-268936, drafting date Jun. 3, 2013. (6 pages including English translation).

* cited by examiner

*Primary Examiner* — Gary C Vieaux
(74) *Attorney, Agent, or Firm* — Arent Fox LLP

(57) ABSTRACT

A circuit for auto-focus adjustment includes a calculating unit configured to calculate an indicator of randomness of pixel values in a captured image, a direction determining unit configured to compare a first value of the indicator calculated by the calculating unit in a preceding focus adjustment process with a second value of the indicator calculated by the calculating unit after the calculation of the first value, thereby to determine a direction of focus shift in response to a result of the comparison, and a control unit configured to start a focus adjustment process by which a focus position is first moved in the direction of focus shift determined by the direction determining unit.

15 Claims, 22 Drawing Sheets

FOCUS ADJUSTMENT BASED ON INDICATOR OF RANDOMNESS OF PIXEL VALUES

CROSS-REFERENCE TO RELATED APPLICATIONS

The present application is based upon and claims the benefit of priority from the prior Japanese Patent Application No. 2009-268936 filed on Nov. 26, 2009, with the Japanese Patent Office, the entire contents of which are incorporated herein by reference.

FIELD

The disclosures herein generally relate to optical systems and electronic circuits, and particularly relate to a circuit and method for controlling auto focus in an optical system.

BACKGROUND

Digital cameras including digital still cameras (i.e., static image cameras) and digital video cameras (i.e., moving image cameras) are provided with an auto-focus function for automatically placing the focus point of the lens on a camera subject. Focusing is achieved by using the peak value or the like of a second-order differential of a captured image as a contrast value and by adjusting the distance between the lens and the imaging sensor to maximize the contrast value. When a camera subject on which the focus point is placed moves, for example, such movement may cause the loss of focus. In such a case, whether the focus point should be brought closer to the lens or moved farther away from the lens relative to the current focus position is determined based on the direction in which the previous auto focus control has moved the focus position. Namely, if the immediately preceding auto focus control has moved the focus position closer to the lens, the current auto focus control also brings the focus position closer to the lens by a distance corresponding to one control step. If the immediately preceding auto focus control has moved the focus position away from the lens, the current auto focus control also moves the focus position away from the lens by a distance corresponding to one control step. If the movement of the focus position corresponding to one control step results in an increase in the contrast value, the focus position continues to be moved in the same direction until the position is found at which the contrast value becomes the maximum. If the movement of the focus position corresponding to one control step results in a decrease in the contrast value, the focus position is moved in the opposite direction until the position is found at which the contrast value becomes the maximum.

In the continuous AF which continuously performs auto focusing as described above, the direction in which the focus point is moved by a distance corresponding to one control step upon losing focus may be an incorrect direction, and the occurrence of such a mistake is not rare. The focus position is controlled by mechanically adjusting the distance between the lens and the imaging face of the imaging device. It is thus difficult to achieve a high-speed operation which moves the lens in one direction immediately after moving it in the opposite direction that has turned out be a wrong direction. When the direction of initial movement is incorrect, the time required to achieve focusing becomes lengthy.

RELATED-ART DOCUMENTS

Patent Document

[Patent Document 1] Japanese Laid-open Patent Publication No. 5-80248
[Patent Document 2] Japanese Laid-open Patent Publication No. 5-300421
[Patent Document 3] Japanese Laid-open Patent Publication No. 2008-193514

SUMMARY

According to an aspect of the embodiment, a circuit for auto-focus adjustment includes a calculating unit configured to calculate an indicator of randomness of pixel values in a captured image, a direction determining unit configured to compare a first value of the indicator calculated by the calculating unit in a preceding focus adjustment process with a second value of the indicator calculated by the calculating unit after the calculation of the first value, thereby to determine a direction of focus shift in response to a result of the comparison, and a control unit configured to start a focus adjustment process by which a focus position is first moved in the direction of focus shift determined by the direction determining unit.

According to an aspect of the embodiment, an imaging apparatus includes a lens, an imaging device, a calculating unit configured to calculate an indicator of randomness of pixel values in an image captured by the imaging device, a direction determining unit configured to compare a first value of the indicator calculated by the calculating unit in a preceding focus adjustment process with a second value of the indicator calculated by the calculating unit after the calculation of the first value, thereby to determine a direction of positional shift of the lens in response to a result of the comparison, and a control unit configured to start a focus adjustment process by which the lens is first moved in the direction of positional shift determined by the direction determining unit.

According to an aspect of the embodiment, a method for auto-focus adjustment includes calculating an indicator of randomness of pixel values in a captured image, comparing a first value of the indicator calculated in a preceding focus adjustment process with a second value of the indicator calculated after the calculation of the first value, determining a direction of focus shift in response to a result of the comparison, and starting a focus adjustment process by which a focus position is first moved in the determined direction of focus shift.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a flowchart illustrating an example of the operation sequence performed at the time of power-on;

FIG. 5 is a timing chart illustrating an example of the operation performed at the time of power-on;

DESCRIPTION OF EMBODIMENTS

Figure 1:
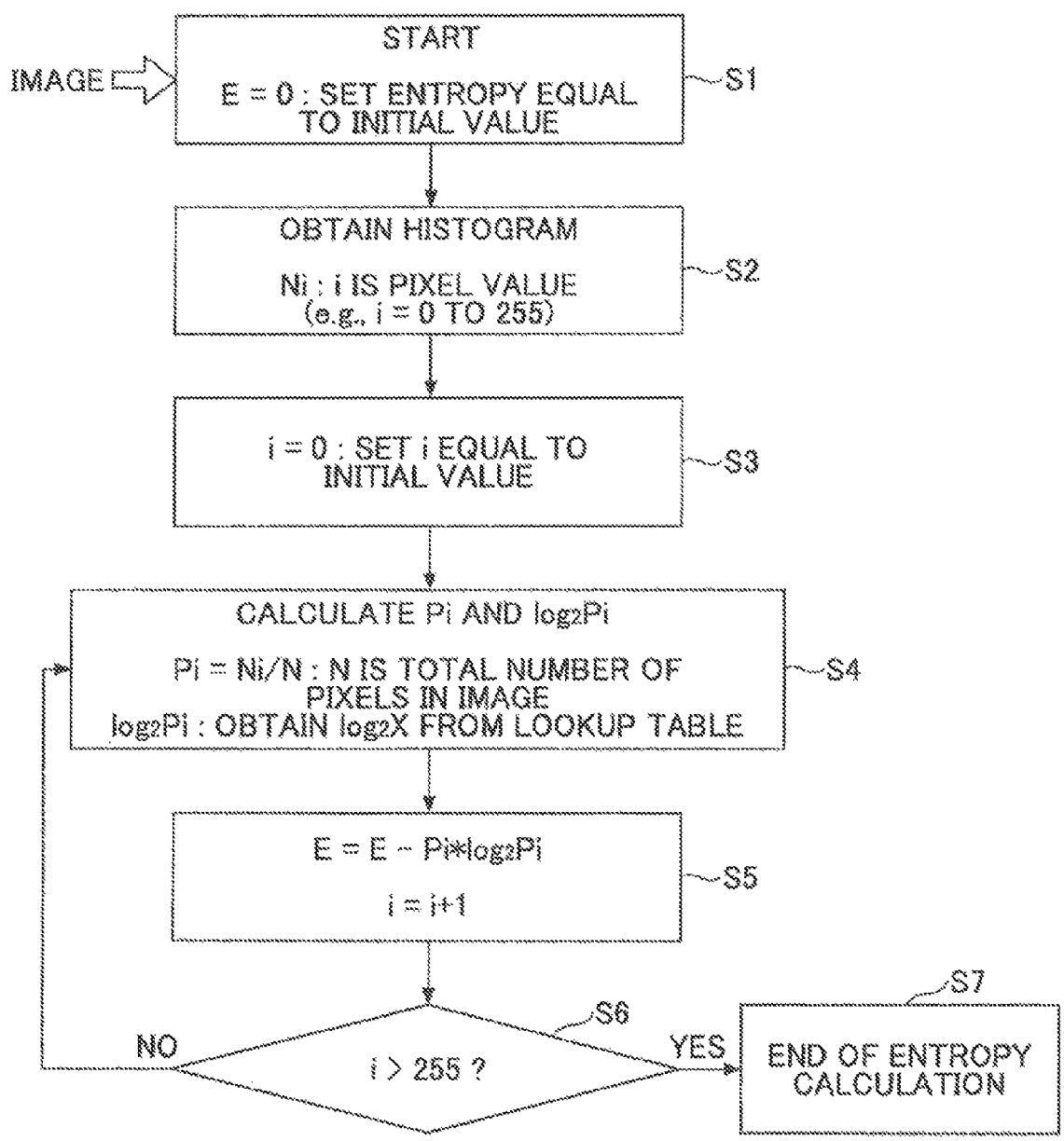
FIG. 1 is a flowchart showing a method of calculating image entropy.

In the following, embodiments will be described with reference to the accompanying drawings.

In an imaging apparatus provided with an auto focus adjustment circuit described below, the direction in which the focus position is moved is determined based on an indicator of randomness of pixel values in a captured image. When a camera subject which is focused on moves closer to or away from the imaging apparatus, the focus is lost, resulting in the captured image being blurred. In such a case, if the direction in which the camera subject has moved is identified, the focus point may be moved in the identified direction to be placed on the subject again. In general, the entire image screen includes a background image and an image of an object (i.e., person or the like) that is the camera subject. Things in the background are generally situated at the distance, and thus appear as a number of small objects having various levels of luminance and various colors in the background. It follows that the randomness of pixel values in the background image is large. On the other hand, the object that is the camera subject is situated at a close distance. The image of such an object is thus comprised of a small number of things each having a relatively uniform luminance and color within a contiguous image area covering a certain expanse. It follows that the randomness of pixel values of the camera subject image is small.

When the camera subject comes closer to the imaging apparatus, the area size occupied by the image of the camera subject increases in the image screen while the area size occupied by the background image decreases. In this case, therefore, the randomness of pixel values of the entire image decreases. When the camera subject moves farther away from the imaging apparatus, the area size occupied by the image of the camera subject decreases in the image screen while the area size occupied by the background image increases. In this case, therefore, the randomness of pixel values of the entire image increases. In this manner, the randomness of pixel values (i.e., luminance values or chrominance values) of the captured image may be computed to provide somewhat reliable information about the direction in which the camera subject has moved to change distance from the camera.

An example of an indicator of such randomness of image pixel values includes entropy. Entropy E may be calculated as follows.

$$E = -\Sigma Pi \log_2(Pi)$$

Pi represents the probability of pixel value i (e.g., one of the values in the range from 0 to 255) occurring in one image screen comprised of N pixels. When the number of pixels having the pixel value i is denoted as Ni, then, Pi is expressed as follows.

$$Pi = Ni/N$$

As is well known, the entropy of an image becomes the maximum when the pixel values are uniformly distributed over the distribution range (e.g., 0 to 255), and becomes the minimum when the pixel values concentrate on a single value in the distribution range. When the base of the logarithm in the above-noted entropy formula is 2, the entropy is represented in units of bits. The base of the logarithm in the entropy formula may be another value such as the base "e" of natural logarithm or the radix "10" of the decimal number system. As will be described later, which one of two entropy values is larger than the other only matters in order to determine the direction in which the camera subject moves to change distance from the imaging apparatus. A ratio of these two values, for example, has no bearing on the determination. Accordingly, a value that monotonously increases or decreases as a function of entropy may be used in place of the entropy itself. Such a value may be computed by use of the above-noted entropy formula after some transformation is applied to a captured image, or may be computed by use of a modified version of the above-noted entropy formula, for example. The indicators of randomness obtained by such modifications may be regarded as different modes of entropy. An indicator of randomness corresponding to one such mode of entropy may be used in the imaging apparatus which will be described below.

In the description that follows, an imaging apparatus that uses entropy as an indicator of randomness of image pixel values will be described as an example. However, this is not a limiting example, and the indicator of randomness is not limited to entropy or modified versions of entropy. For example, the pixel value distribution of a captured image may be obtained as a histogram, and an indicator (e.g., standard deviation or variance) indicative of broadness of the histogram may be used as an indicator of randomness. Alternatively, an indicator of randomness may reflect the spatial randomness of image pixel values (e.g., the sharpness of an autocorrelation function of the image or the broadness of the spatial frequency distribution), for example.

FIG. 1 is a flowchart showing a method calculating image entropy. In step S1, an entropy value E is set equal to an initial value of "0". In step S2, the number Ni of pixels having a pixel value i (e.g., i=0 to 255) in the image subjected to entropy calculation is counted with respect to each pixel value i, thereby producing a histogram. In step S3, the suffix i is set equal to an initial value of "0". In step S4, probability Pi (=Ni/N) is calculated where N represents the total number of pixels in the image of interest, followed by computing the information quantity $\log_2 Pi$. In step S5, $E=E-Pi \cdot \log_2 Pi$ is calculated with respect to the pixel value i, followed by incrementing i by one. In step S6, a check is made as to whether i is larger than 255. In the case of i being no larger than 255, the procedure goes back to step S4 to repeat the subsequent steps. In the case of i being larger than 255, the procedure goes to step S7, in which the entropy calculation comes to an end.

Figure 2:
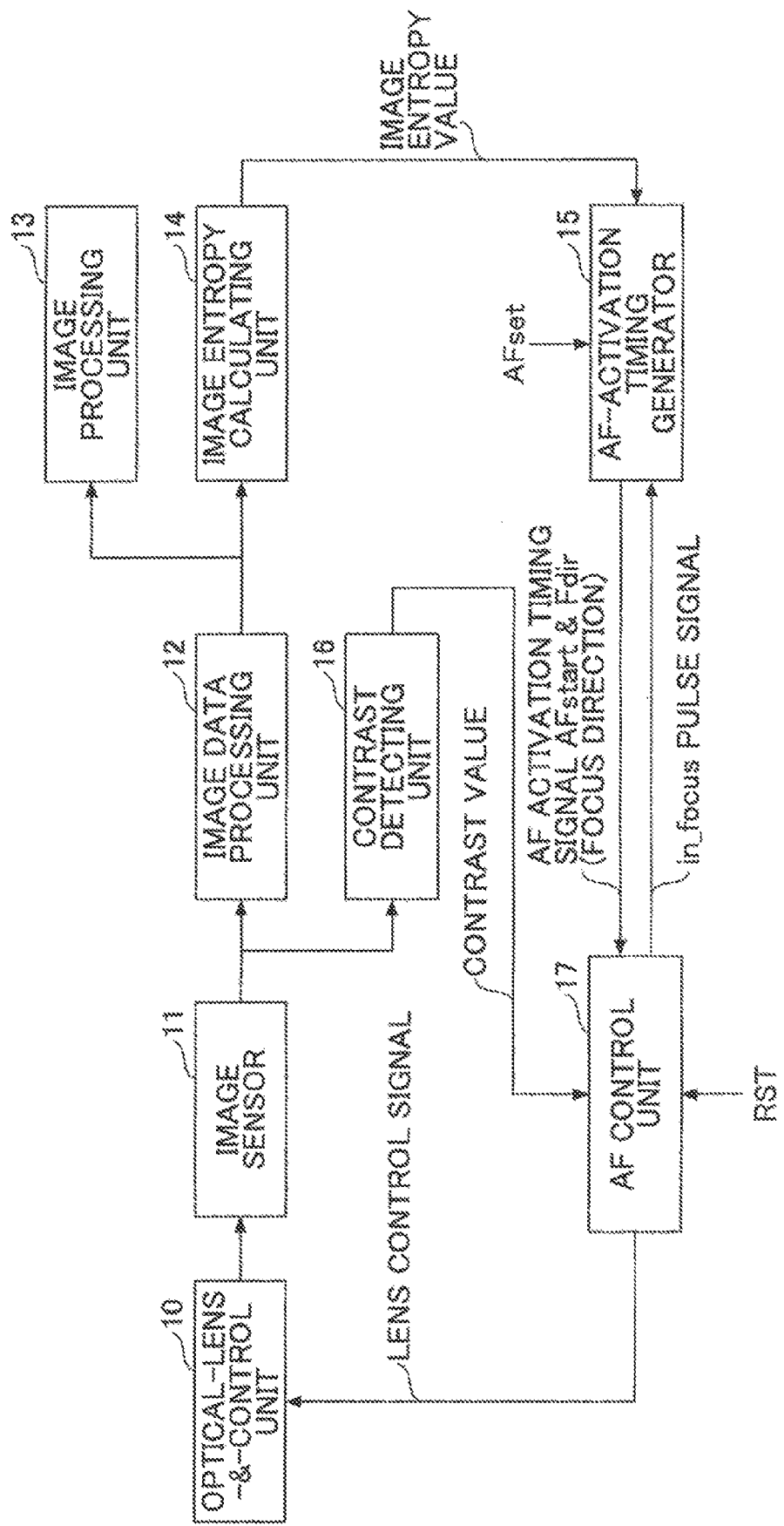
FIG. 2 is a drawing illustrating an example of the configuration of an imaging apparatus.

FIG. 2 is a drawing illustrating an example of the configuration of an imaging apparatus. The imaging apparatus of FIG. 2 includes an optical-lens-&-control unit 10, an image sensor 11, an image data processing unit 12, an image processing unit 13, an image entropy calculating unit 14, an AF-activation timing generator 15, a contrast detecting unit 16, and an AF control unit 17. The optical-lens-&-control unit 10 includes an optical system inclusive of one or more lenses and a control system for controlling lens positions and the like of the optical system. The image sensor 11 may be a CCD (Charge Coupled Device) or CMOS-type solid-state imaging device. In the case of a CMOS-type solid-state imaging device, light receiving elements comprised of photodiodes are arranged in rows and columns to form a pixel array. Electric charge accumulated by photoelectric conversion is read from a pixel that is selected by specifying a row and a column. The image data processing unit 12 performs defect pixel correction, shading correction, optical-black processing, auto-white-balance processing, gamma correction, edge processing, etc. In the defect pixel correction, for example, data of defect pixels included in the digital image data output from the image sensor 11 is processed to correct the defects. In color correction, the color data of each pixel is obtained based on color information obtained from the RGB Bayer pattern. In the shading correction, lens distortion is corrected based on the color data. Moreover, signal conversion from RGB signals to YUV signals and the like are also performed. The image processing unit 13 performs face-area detection, size enlargement, size reduction, encoding, or the like with respect to the digital image data output from the image data processing unit 12. Processed data obtained by the image processing unit 13 is stored in a nonvolatile memory device that is embedded in or detachable from the imaging apparatus.

The image entropy calculating unit 14 calculates an indicator of randomness of pixel values in the captured image. In this example, the image entropy calculating unit 14 calculates entropy with respect to the digital image data output from the image data processing unit 12. The area for which entropy is calculated may be the entire image screen. Alternatively, the object that is the camera subject (e.g., human face) may be detected by the face-detection process or the like, and a partial image area defined by the frame that is set to enclose this object may be subjected to entropy calculation. The image entropy calculating unit 14 supplies the calculated entropy to the AF-activation timing generator 15. The entropy output from the image entropy calculating unit 14 may be an entropy calculated from the current captured image, or may be an average of entropies calculated from current and previous captured images. Namely, the entropy output from the image entropy calculating unit 14 may be an entropy value obtained separately for each frame of digital image data output from the image data processing unit 12, or may be an average of entropy values obtained from plural frames of the digital image data.

The AF-activation timing generator 15 compares a first entropy value calculated by the image entropy calculating unit 14 in the last focus adjustment operation with a second entropy value calculated by the image entropy calculating unit 14 after the calculation of the first entropy value. When the second entropy value differs from the first entropy value calculated in the last focus adjustment operation by more than a predetermined threshold value, the AF-activation timing generator 15 generates an AF activation timing signal AFstart that indicates the activation of an auto-focus control process. Further, the AF-activation timing generator 15 determines the direction in which the focus position is to be moved in response to the result of the above-noted comparison, thereby generating a focus movement direction signal Fdir that indicates the direction of movement. In this example, the indicator of randomness is entropy. Accordingly, when the first entropy value is greater than the second entropy value, the focus movement direction signal Fdir is set equal to a value indicative of the direction in which the focus position moves father away from the lens. When the first entropy value is smaller than the second entropy value, the focus movement direction signal Fdir is set equal to a value indicative of the direction in which the focus position moves closer to the lens. The contrast detecting unit 16 derives a contrast value of the captured image by calculating the peak value of a second-order differential of the digital image data output from the image sensor 11, and supplies the derived contrast value to the AF control unit 17.

The AF control unit 17 starts the auto-focus adjustment process in response to the AF activation timing signal AFstart. In so doing, the AF control unit 17 starts the focus adjustment process by moving the focus position in the direction of focus shift indicated by the focus movement direction signal Fdir. Namely, the AF control unit 17 first moves the focus position by one control step in the direction of focus shift indicated by the focus movement direction signal Fdir. If the movement of the focus position corresponding to one control step results in an increase in the contrast value, the focus position continues to be moved in the same direction until the position is found at which the contrast value becomes the maximum. If the movement of the focus position corresponding to one control step results in a decrease in the contrast value, the focus position is moved in the opposite direction until the position is found at which the contrast value becomes the maximum. Since the direction of focus shift for initially moving the focus position for one control step is determined by use of the indicator (i.e., entropy in this example) of randomness of pixel values in the captured image, the focus position is likely to be moved in a correct direction. The AF control unit 17 produces an in_focus pulse signal upon achieving focus through the auto-focus adjustment process.

Figure 3:
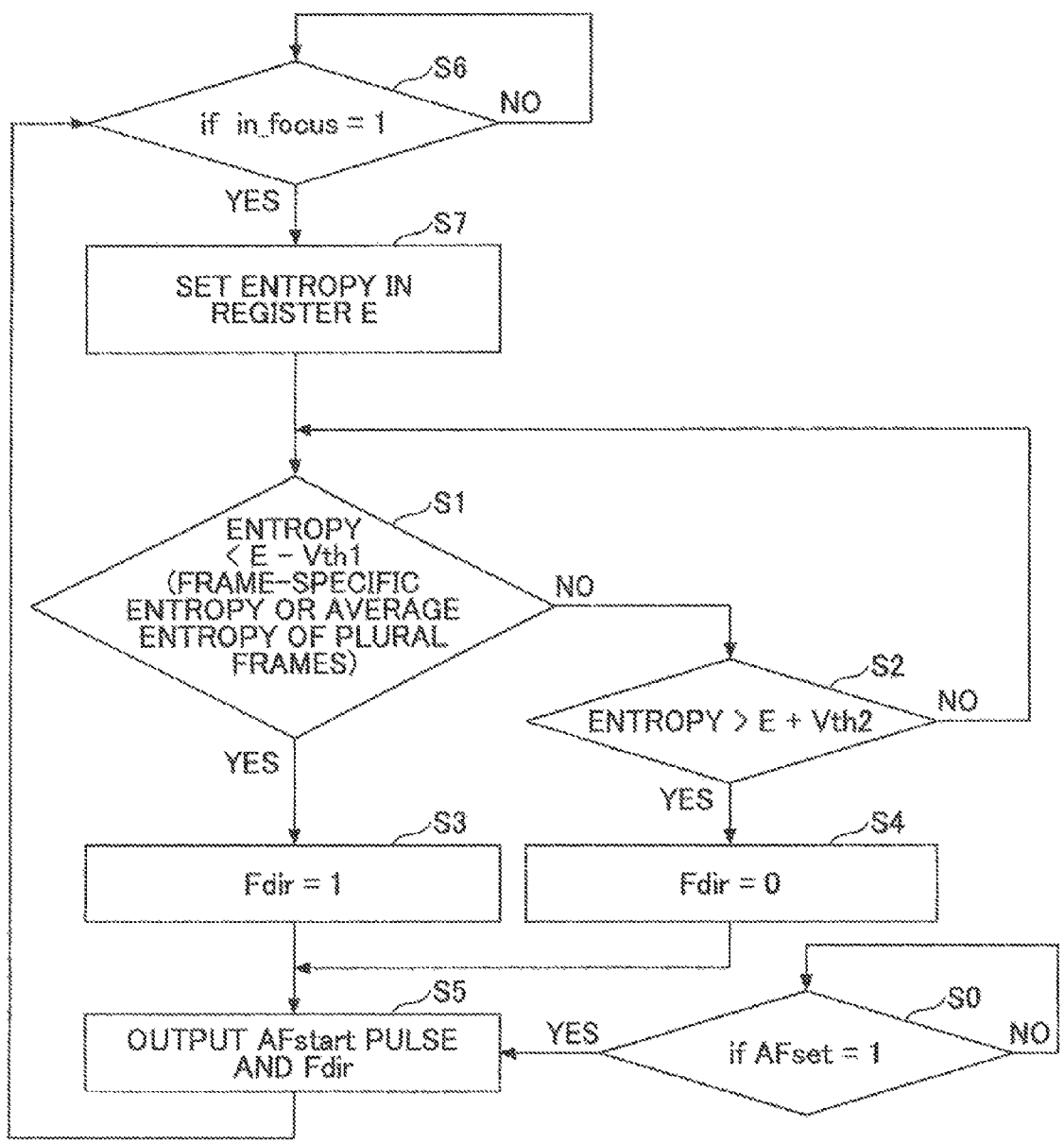
FIG. 3 is a flowchart illustrating the operation sequence of an AF-activation timing generator.

FIG. 3 is a flowchart illustrating the operation sequence of the AF-activation timing generator 15. In step S0, a check is made as to whether the auto-focus setting signal Fset is 1. This check may be performed at the time of power-on. When the power of the imaging apparatus is turned on, the auto-focus setting signal AFset applied to the AF-activation timing generator 15 is asserted at "1". In response to the assertion of the auto-focus setting signal AFset, the AF-activation timing generator 15 outputs the AF activation timing signal AFstart, and also outputs the focus movement direction signal Fdir stored in an internal register (step S5).

Figure 4:
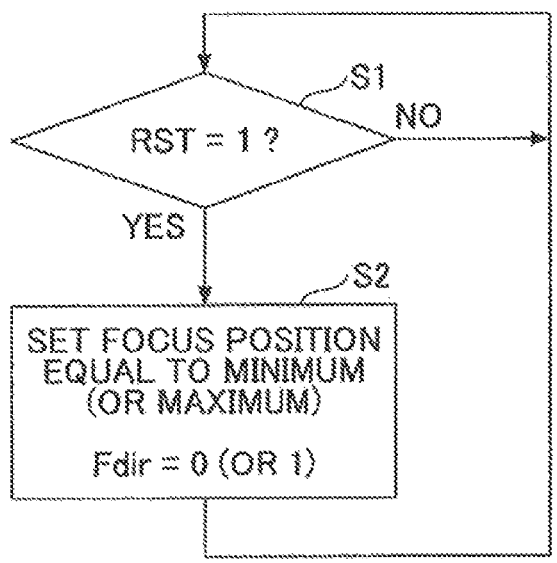

FIG. 4 is a flowchart illustrating an example of the operation sequence performed at the time of power-on. Upon power-on, a reset signal RST is generated (Yes in step S1) In response to the assertion of the reset signal RST being "1", the focus position is set equal to the closest point (or the farthest point), and the focus movement direction signal Fdir is set equal to 0 (or 1) (step S2). Here, Fdir=0 indicates the direction in which the focus position is moved away from the lens, and Fdir=1 indicates the direction in which the focus position is moved closer to the lens.

Figure 5:
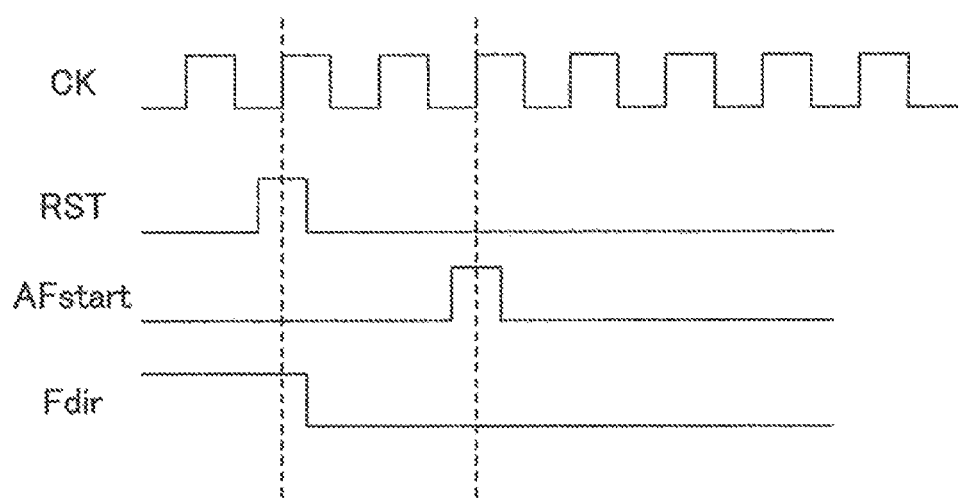

FIG. 5 is a timing chart illustrating an example of the operation performed at the time of power-on. As illustrated in FIG. 5, the reset signal RST is generated upon power-on. In response to the assertion of the reset signal RST being "1", the AF-activation timing generator 15 resets to "0" the focus movement direction signal Fdir stored in an internal register in synchronization with the clock signal CK. In response to the reset signal RST, also, the AF control unit 17 controls the optical-lens-&-control unit 10 such that the focus position is set equal to the point closest to the lens. After this, the AF-activation timing generator 15 performs the process of step S5 of FIG. 3 as previously described, thereby asserting the AF activation timing signal AFstart at "1".

Referring to FIG. 3 again, the AF-activation timing generator 15 continues to monitor the conditions specified in step S1 when the power is kept in the ON state. In step S1, a check is made as to whether the current entropy value calculated from the latest captured image is smaller by more than a first threshold value Vth1 than an entropy value E that has been calculated in the last auto-focus adjustment process and stored in the internal register. It may be noted that the entropy value may be an entropy value obtained separately for each frame of digital image data output from the image data processing unit 12, or may be an average of entropy values obtained from plural frames of the digital image data. If the current entropy value is smaller than E-Vth1, the procedure proceeds to step S3. Otherwise, the procedure proceeds to step S2. In step S2, a check is made as to whether the current entropy value calculated from the latest captured image is larger by more than a second threshold value Vth2 than the entropy value E that has been calculated in the last auto-focus adjustment process and stored in the internal register. It may be noted that the entropy value may be an entropy value obtained separately for each frame of digital image data output from the image data processing unit 12, or may be an average of entropy values obtained from plural frames of the digital image data. If the current entropy value is larger than E+Vth2, the procedure proceeds to step S4. Otherwise, the procedure returns to step S1.

In step S3, the focus movement direction signal Fdir is set equal to "1". Fdir=1 indicates the direction in which the focus position moves closer to the lens. In step S4, the focus movement direction signal Fdir is set equal to "0". Fdir=0 indicates the direction in which the focus position moves away from the lens. The focus movement direction signal Fdir set in step S3 or S4 is stored in the internal register of the AF-activation timing generator 15.

In step S5, the AF-activation timing generator 15 outputs the AF activation timing signal AFstart, and also outputs the focus movement direction signal Fdir stored in the internal register. In response to this, the AF control unit 17 starts an auto-focus adjustment process. The AF control unit 17 produces the in_focus pulse signal upon achieving focus through the auto-focus adjustment process. In step S6, the AF-activation timing generator 15 checks whether the in_focus signal is equal to "1" (indicative of a focused state). In response to the in_focus signal being "1", the procedure proceeds to step S7. In step S7, the current entropy value (i.e., the entropy value obtained in the focused state) is stored as the entropy value E in the internal register.

Figure 6:
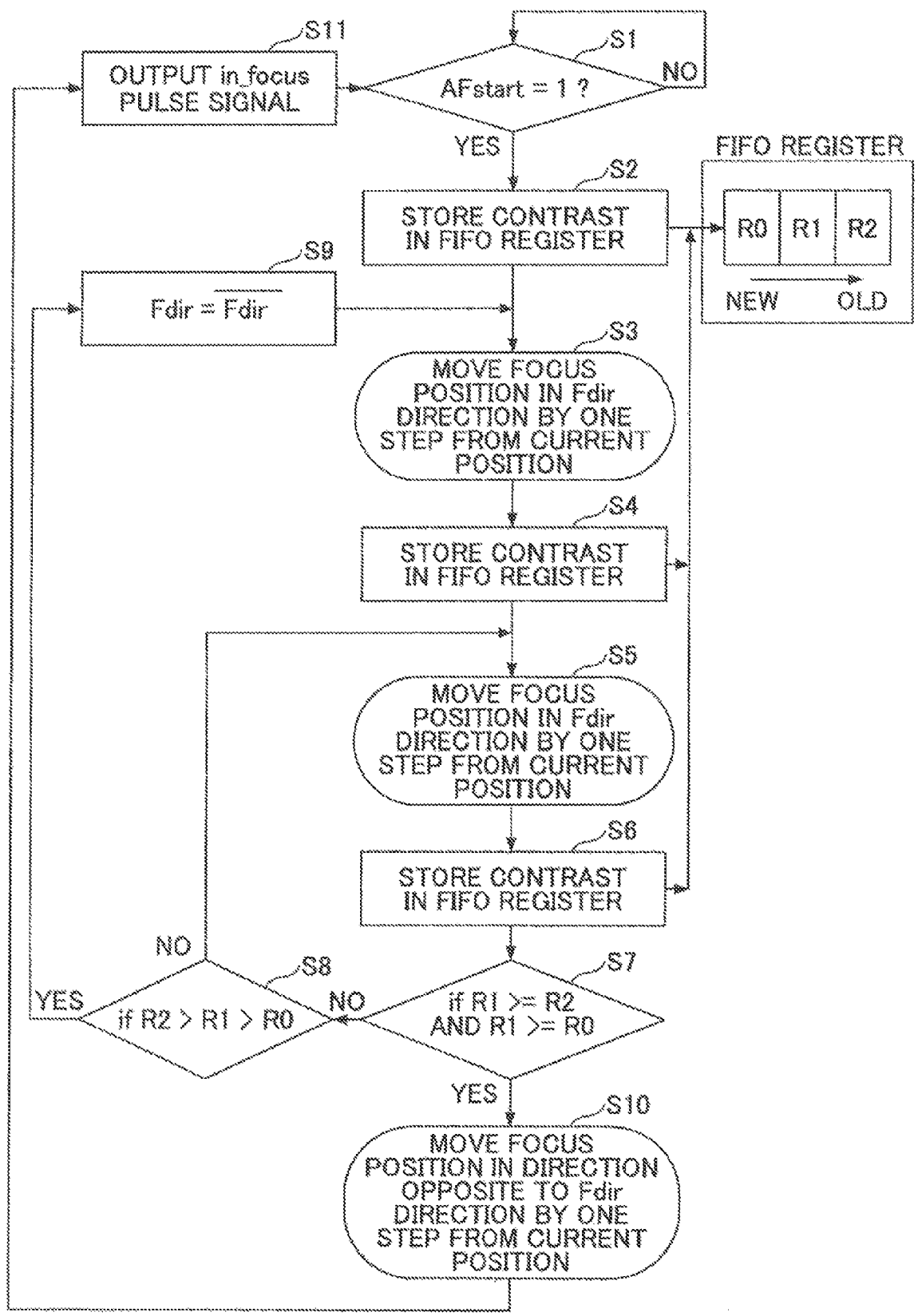
FIG. 6 is a drawing illustrating an example of an auto-focus adjustment process performed by an AF control unit.

FIG. 6 is a drawing illustrating an example of the auto-focus adjustment process performed by the AF control unit 17. In step S1, the AF control unit 17 monitors whether the AF activation timing signal AFstart is equal to 1. Upon the AF activation timing signal AFstart being 1, the AF control unit 17 stores a current contrast value in an internal FIFO register in step S2. In FIG. 6, three contrast values R0, R1, and R2 are the newest contrast value, the first preceding contrast value, and the second preceding contrast value, respectively.

In step S3, the AF control unit 17 moves the focus position from the current position by one control step in the direction specified by the focus movement direction signal Fdir. In step S4, the AF control unit 17 stores the current contrast value (i.e., the contrast value obtained after moving one control step in step S3) in the FIFO register. In step S5, the AF control unit 17 moves the focus position from the current position by one control step in the direction specified by the focus movement direction signal Fdir. In step S6, the AF control unit 17 stores the current contrast value (i.e., the contrast value obtained after moving one control step in step S5) in the FIFO register.

Figure 7:
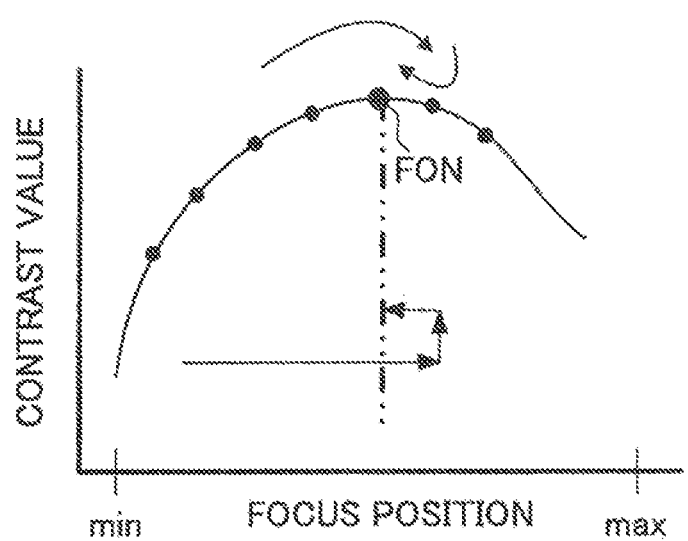
FIG. 7 is a drawing illustrating contrast changes during an auto-focus adjustment process.

In step S7, a check is made as to whether the first preceding contrast value R1 is no smaller than the second preceding contrast value R2, and the first preceding contrast value R1 is no smaller than the current contrast value R0. The result of this check becomes "Yes" when the immediately preceding contrast value assumes the maximum peak value as in the case of a focus position FON illustrated in FIG. 7. If these conditions are not satisfied, the AF control unit 17 checks in step S8 whether R2>R1>R0 is satisfied. The fact that the condition of R2>R1>R0 is satisfied means that the contrast values monotonously decrease. In this case, it is ascertained that the current setting of the focus position shift direction is opposite to the correct direction. In step S9, thus, the focus movement direction signal Fdir is reversed, and the procedure returns to step S3 to repeat the subsequent steps. If the condition of R2>R1>R0 is not satisfied, it is ascertained that the current setting of the focus position shift direction indicates the correct direction. In this case, the procedure returns to, step S5 to repeat the subsequent steps.

If the result of check in step S7 is "Yes", the procedure proceeds to step S10. In step S10, the AF control unit 17 moves the focus position from the current position by one control step in the direction opposite to the direction specified by the focus movement direction signal Fdir. The result of check in step S7 becomes "Yes" when the immediately preceding contrast value assumes the maximum peak value as in the case of the focus position FON illustrated in FIG. 7, which means that the current focus position has passed the correct position by one excess control step. In step S10, thus, the focus position is moved by one control step to return to the previous position, so that the current focus position is situated at the position FON illustrated in FIG. 7. Thereafter, the AF control unit 17 outputs the in_focus pulse signal in step S11.

Figure 8:
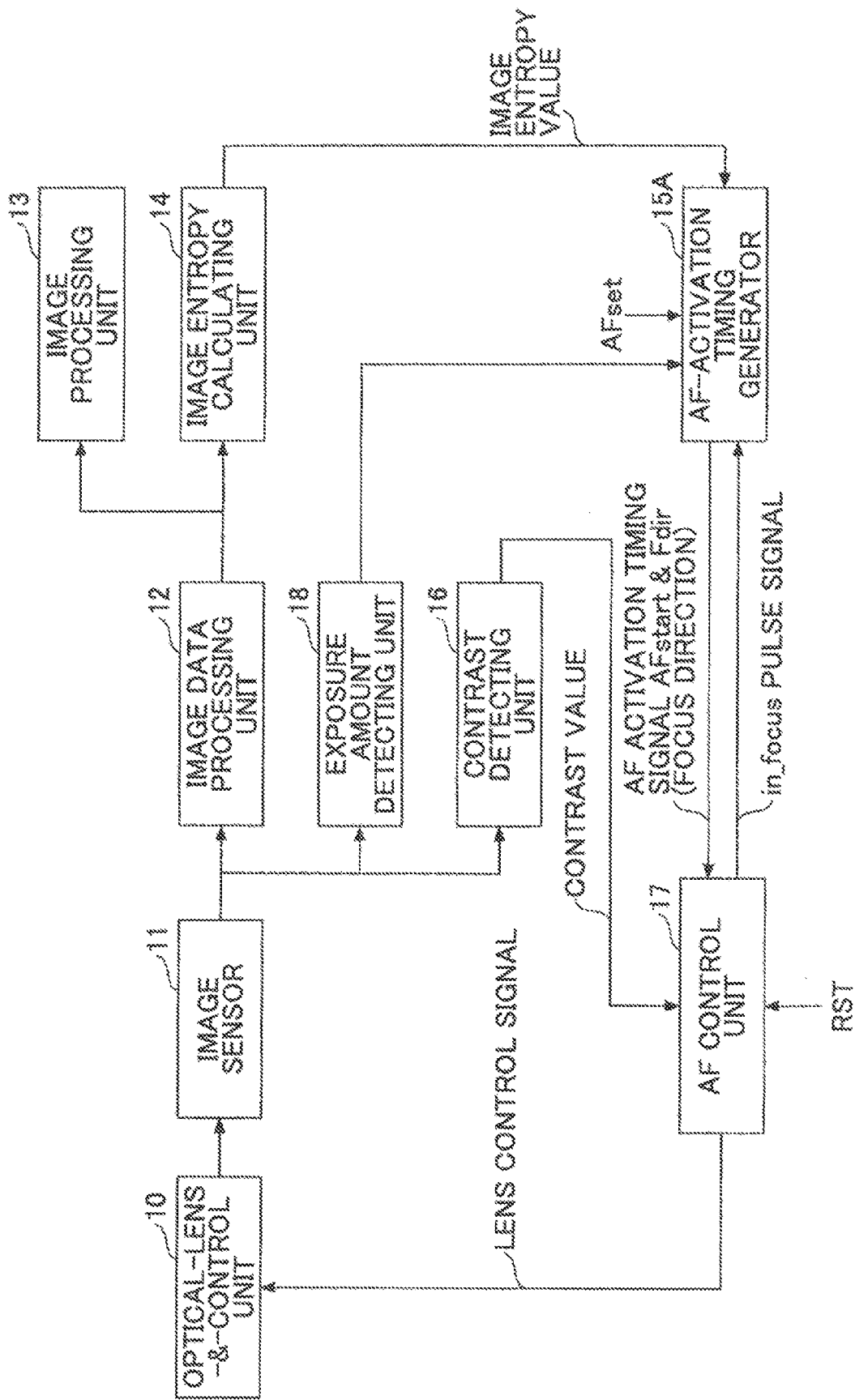
FIG. 8 is a drawing illustrating a variation of the imaging apparatus illustrated in FIG. 2.

FIG. 8 is a drawing illustrating a variation of the imaging apparatus illustrated in FIG. 2. In FIG. 8, the same elements as those of FIG. 2 are referred to by the same numerals, and a description thereof will be omitted. The imaging apparatus of FIG. 8 differs from the imaging apparatus of FIG. 3 in that an exposure amount detecting unit 18 is additionally provided. Due to the provision of the exposure amount detecting unit 18, the AF-activation timing generator 15 of FIG. 2 is replaced by an AF-activation timing generator 15A in FIG. 8. The exposure amount detecting unit 18 calculates an exposure amount from the digital image data output from the image sensor 11, and supplies data indicative of the calculated exposure amount to the AF-activation timing generator 15A. The AF-activation timing generator 15A takes into account the exposure amount data to determine the timing at which the auto-focus adjustment process starts. The configuration and operation of the remaining part of the imaging apparatus are the same as or similar to the configuration and operation of the imaging apparatus illustrated in FIG. 2.

Figure 9:
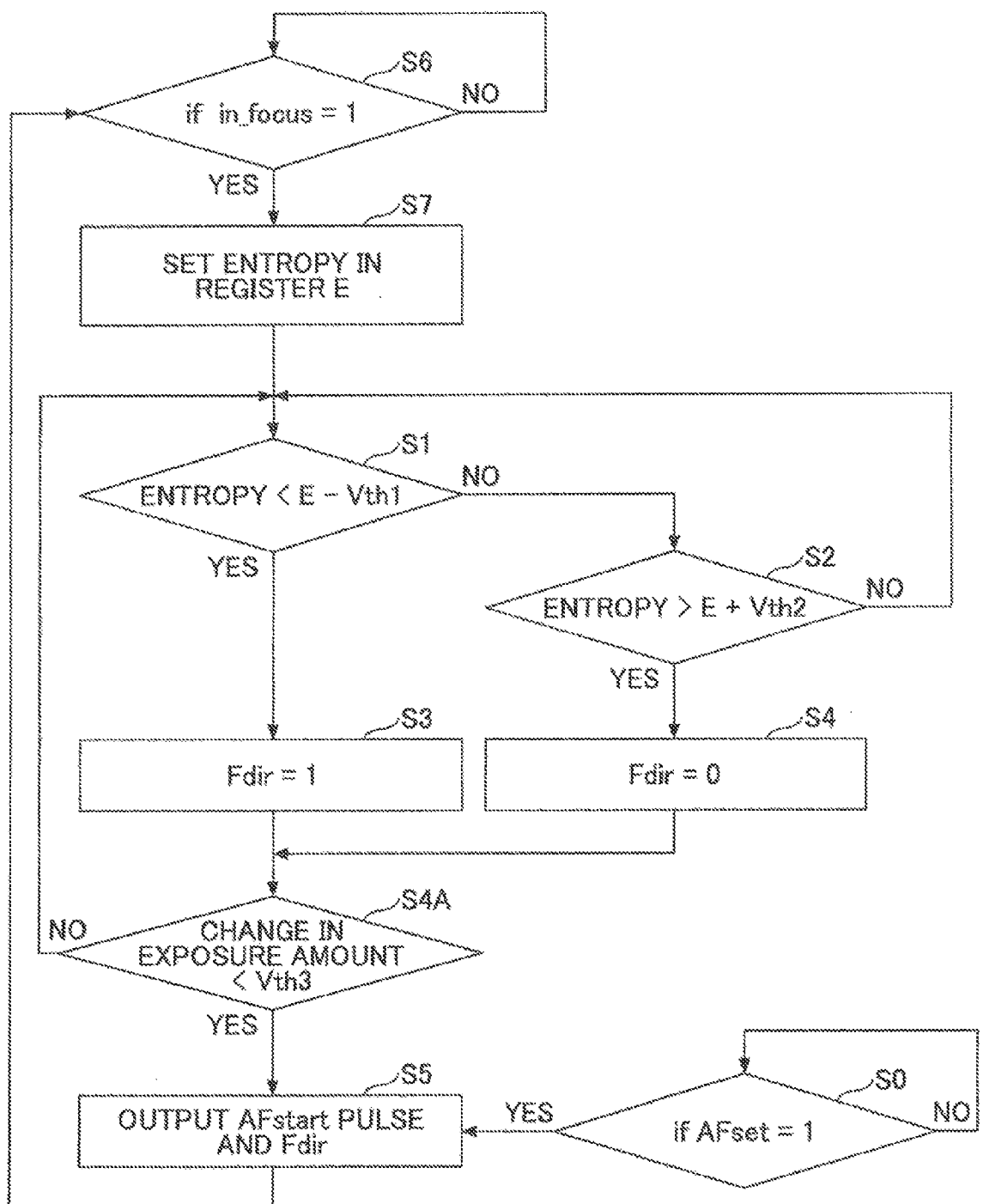
FIG. 9 is a flowchart illustrating an example of the operation of the AF-activation timing generator.

FIG. 9 is a flowchart illustrating an example of the operation of the AF-activation timing generator 15A. The operation illustrated in FIG. 9 differs from the operation of the AF-activation timing generator 15 illustrated in FIG. 3 in that step S4A is additionally provided. The other steps of the operation are the same or similar between FIG. 3 and FIG. 9. In step S4A, a check is made, following the determination of the focus movement direction signal Fdir, as to whether a change in exposure is smaller than a predetermined threshold value Vth3. If the change in exposure is smaller than the predetermined threshold value Vth3, the procedure proceeds to step S5 to perform an auto-focus adjustment process. If the change in exposure is no smaller than the predetermined threshold value Vth3, the procedure proceeds to step S1 to repeat the procedure that starts with the checking of a current entropy value.

The exposure amount of a captured image may suddenly increase when the sun appears from behind the clouds to cause a sudden increase in the amount of sunlight or when a window shade is opened in the room. In such a case, a large number of pixels have their pixel values saturating on the white side in the digital image data of a captured image, resulting in a sudden drop of the entropy value of the image. Similarly, a large number of pixels have their pixel values saturating on the black side when the exposure amount of a captured image suddenly decreases, resulting in a sudden drop of the entropy value of the image. It may be noted that the focused state may already be in existence prior to an increase or decrease in exposure. Accordingly, when the auto-exposure adjustment of the imaging apparatus works in response to the change in exposure to achieve a proper exposure state, the focused state may be returned. It may be not preferable to start an auto-focus adjustment process in response to a change in entropy values caused by a change in exposure. In the operation example illustrated in FIG. 9, if the change in exposure is no smaller than the predetermined threshold value Vth3, the whole procedure is performed again by starting from the checking of a current entropy value.

Figure 10:
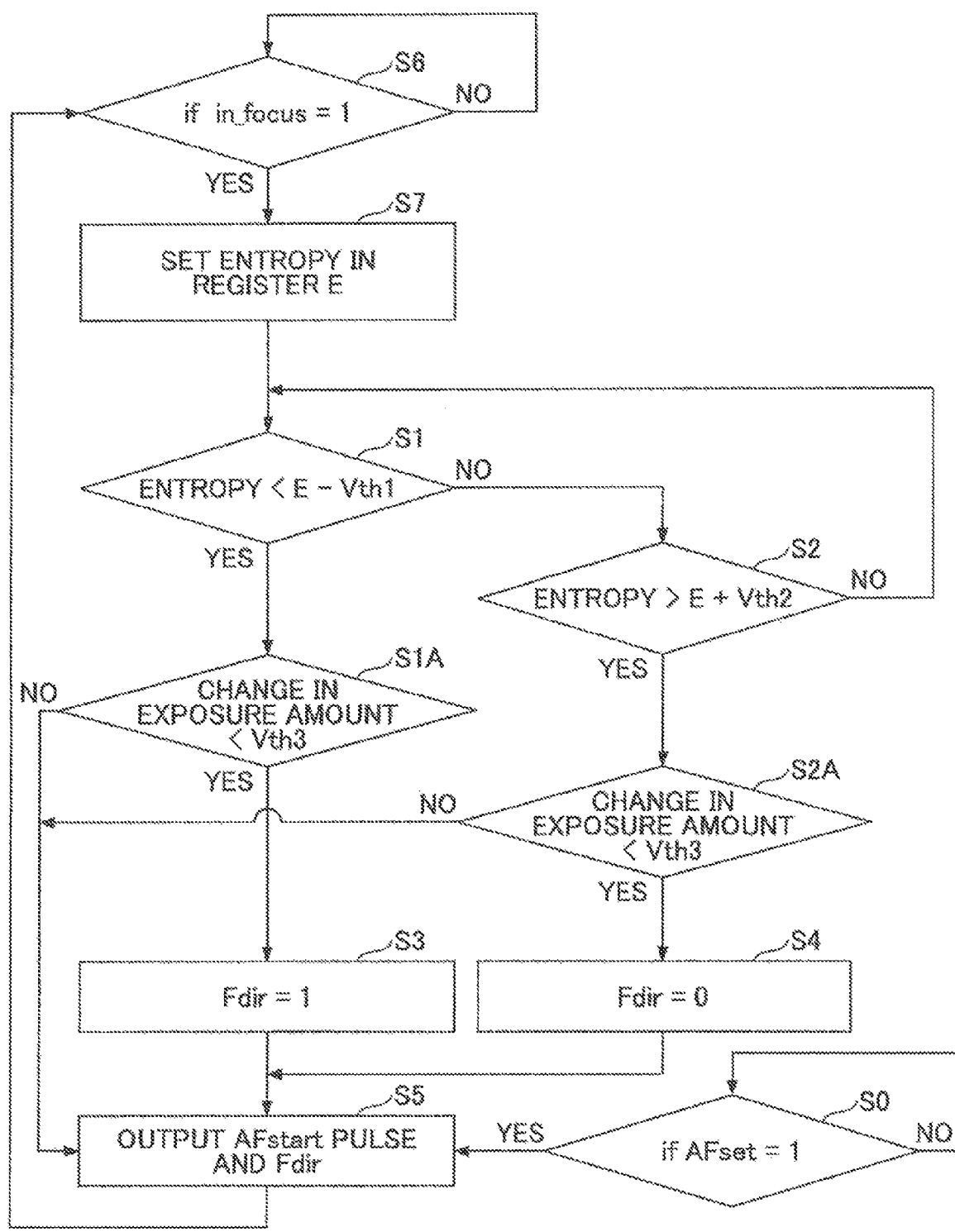
FIG. 10 is a flowchart illustrating another example of the operation of the AF-activation timing generator.

FIG. 10 is a flowchart illustrating another example of the operation of the AF-activation timing generator 15A. The operation illustrated in FIG. 10 differs from the operation of the AF-activation timing generator 15 illustrated in FIG. 3 in that steps S1A and S2A are additionally provided. The other steps of the operation are the same or similar between FIG. 3 and FIG. 10. In step S1A, a check is made, after determining that the current entropy value is smaller by more than Vth1 than the register-stored entropy value E, as to whether a change in exposure is smaller than the predetermined threshold value Vth3. If the change in exposure is smaller than the predetermined threshold value Vth3, the Fdir setting process of step S3 is skipped, and the process of outputting an AFstart pulse and an Fdir signal in step S5 is performed. Similarly, in step S2A, a check is made, after determining that the current entropy value is larger by more than Vth2 than the register-stored entropy value E, as to whether a change in exposure is smaller than the predetermined threshold value Vth3. If the change in exposure is smaller than the predetermined threshold value Vth3, the Fdir setting process of step S4 is skipped, and the process of outputting an AFstart pulse and an Fdir signal in step S5 is performed.

As previously described, when the exposure amount of a captured image exhibits a sudden change, the image entropy value also exhibits a sudden change despite the fact that the focused state is maintained. Such a change in the entropy value caused by a change in exposure does not reflect the direction in which the camera subject moves. It is thus not desirable to move the focus position based on the information about the direction of focus shift as determined in response to such a change in the entropy value. In the operation example illustrated in FIG. 10, if the change in exposure is no smaller than the predetermined threshold value Vth3, the process of setting Fdir in steps S3 and S4 is skipped. In the configuration illustrated in FIG. 6, the focus movement direction signal Fdir is supplied from the AF-activation timing generator 15A to the AF control unit 17. In reality, however, provision may be made such that the AF-activation timing generator 15A and the AF control unit 17 share the same register that stores Fdir. In such a case, the value of Fdir in the focused state has been, set equal to the direction of focus shift used in the immediately preceding auto-focus adjustment process according to the operation of the AF control unit 17 illustrated in the flowchart of FIG. 6. When the process of setting Fdir in steps S3 and S4 is skipped as illustrated in FIG. 10, therefore, a new auto-focus adjustment process is performed by using, as an initial direction, the direction of focus shift used in the immediately preceding auto-focus adjustment process.

Figure 11:
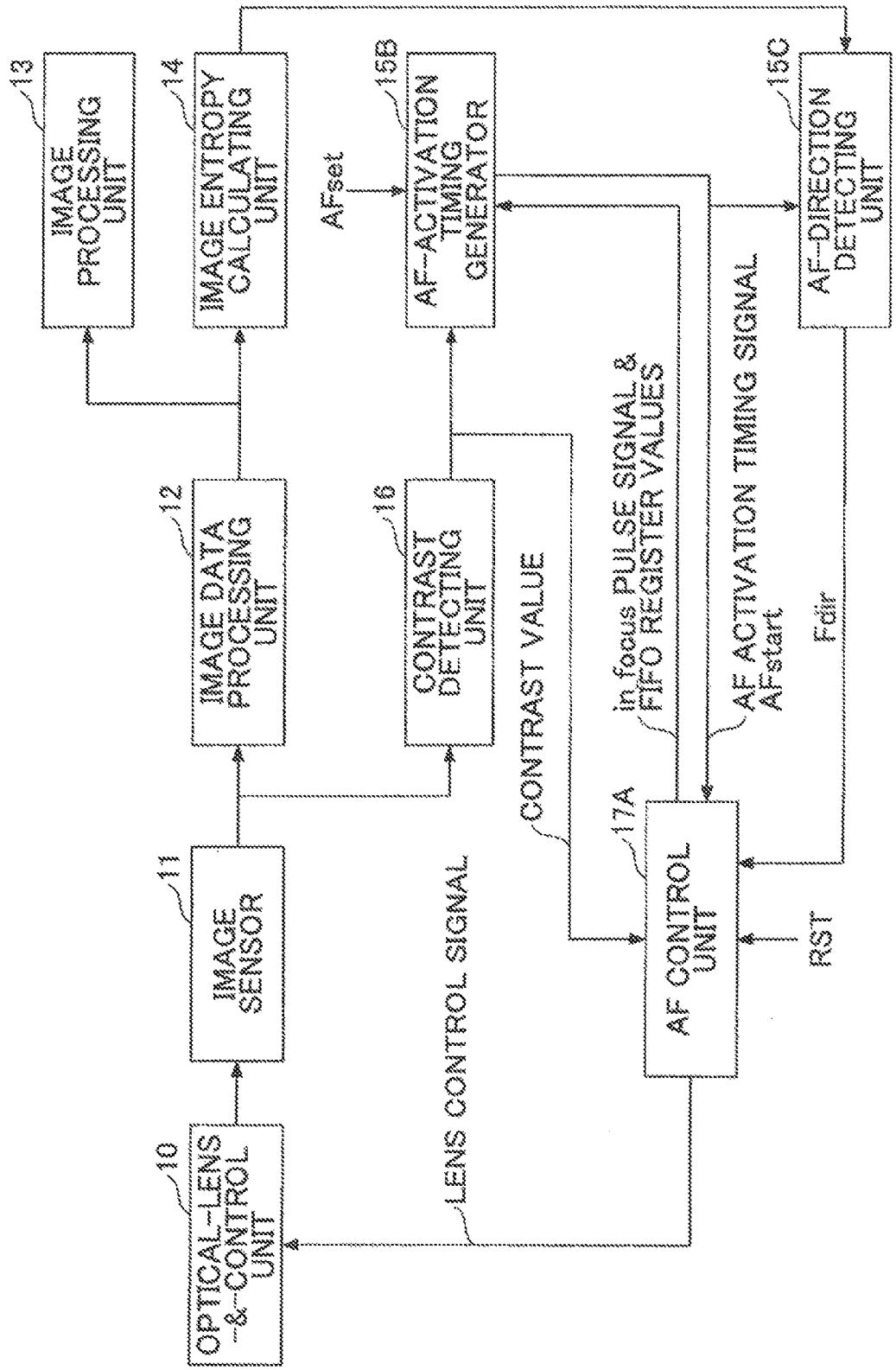
FIG. 11 is a drawing illustrating another example of the configuration of the imaging apparatus.

FIG. 11 is a drawing illustrating another example of the configuration of the imaging apparatus. In FIG. 11, the same elements as those of FIG. 2 are referred to by the same numerals, and a description thereof will be omitted. The imaging apparatus of FIG. 11 differs from the imaging apparatus of FIG. 2 in that an AF-activation timing generator 15B and an AF-direction detecting unit 15C are provided in place of the AF-activation timing generator 15 of FIG. 2. The function to generate the AF activation timing signal AFstart is provided by the AF-activation timing generator 15B, and the function to generate the focus movement direction signal Fdir is provided by the AF-direction detecting unit 15C. The generation of the AF activation timing signal AFstart by the AF-activation timing generator 15B is not performed based on entropy values, but performed based on contrast values. The configuration and operation of the remaining part of the imaging apparatus are the same as or similar to the configuration and operation of the imaging apparatus illustrated in FIG. 2. It may be noted, however, that provision is made such that the AF control unit supplies FIFO register values to the AF-activation timing generator 15B. Due to this provision, the AF control unit 17 of FIG. 2 is replaced by an AF control unit 17A in FIG. 8. The operation of the AF control unit 17A is the same as or similar to the operation of the AF control unit 17, and is illustrated in the flowchart of FIG. 6. In step S11 of FIG. 6, however, not only the in_focus pulse signal but also the FIFO register values are output.

Figure 12:
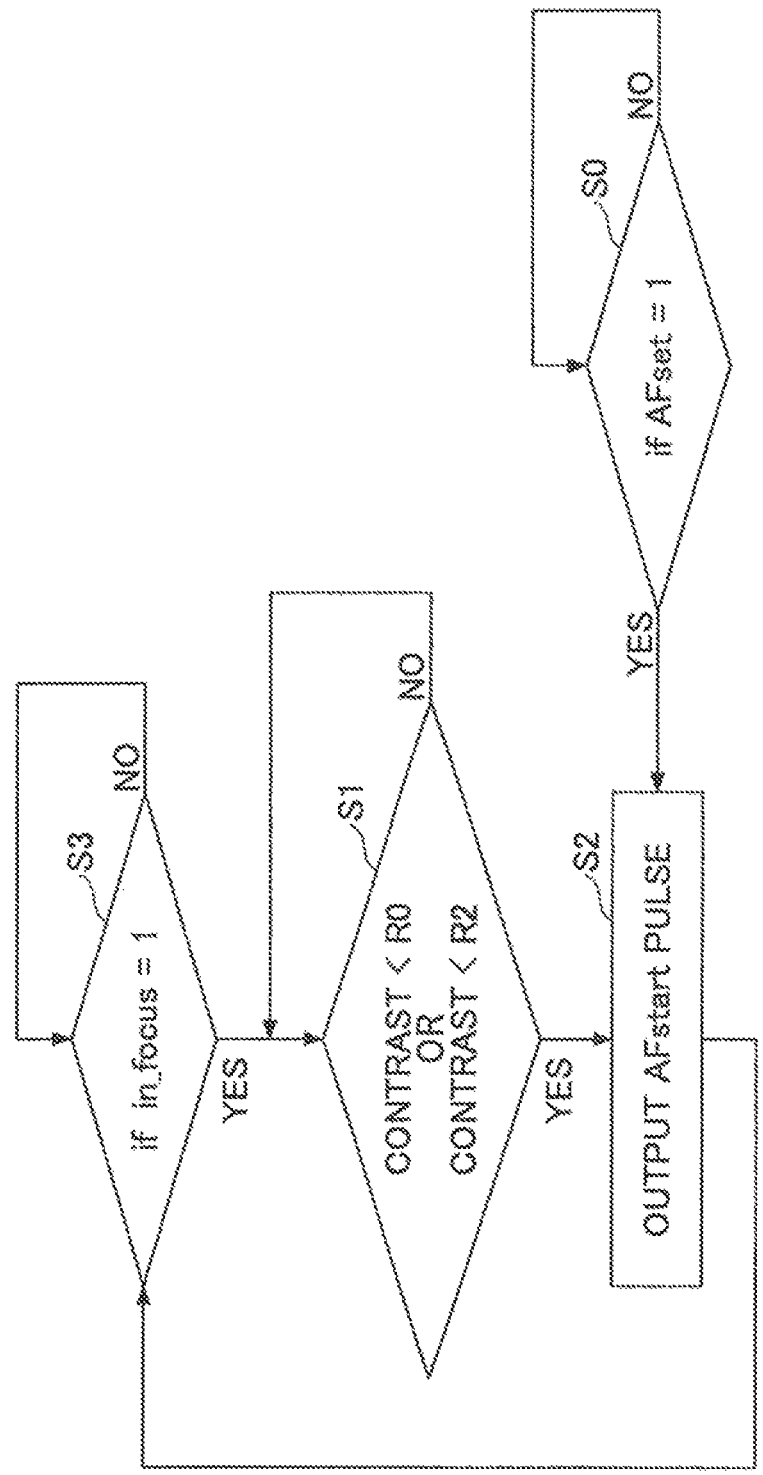
FIG. 12 is a flowchart illustrating an example of the operation of the AF-activation timing generator.

FIG. 12 is a flowchart illustrating an example of the operation of the AF-activation timing generator 15B. In step S0, a check is made as to whether the auto-focus setting signal Fset is 1. This check may be performed at the time of power-on. When the power of the imaging apparatus is turned on, the auto-focus setting signal AFset applied to the AF-activation timing generator 15B is asserted at "1". In response to the assertion of the auto-focus setting signal AFset, the AF-activation timing generator 15 outputs the AF activation timing signal AFstart (step S2).

The AF-activation timing generator 15B continues to monitor the conditions specified in step S1 when the power is kept in the ON state. In step S1, a check is made as to whether the current contrast value is smaller than the contrast value R0 (see FIG. 6) lastly stored in the last auto-focus adjustment process, or is smaller than the second preceding contrast value R2. Namely, a check is made as to whether the current contrast value is smaller than the contrast values immediately preceding and following the focus position FON of FIG. 7 at which the focused state is obtained. If the result of check in step S1 is "Yes", the procedure proceeds to step S2. Otherwise, the check in step S1 is repeated. In step S2, the AF-activation timing generator 15B outputs the AF activation timing signal AFstart. In response, the AF-direction detecting unit 15C determines the direction of focus shift, and the AF control unit 17A starts an auto-focus adjustment process. The AF control unit 17A produces the in_focus pulse signal upon achieving focus through the auto-focus adjustment process. In step S3, the AF-activation timing generator 15B checks whether the in_focus signal is equal to "1" (indicative of a focused state). When the in_focus signal becomes 1, the AF-activation timing generator 15B is placed in the state in which the check process of step S1 is performed again.

Figure 13:
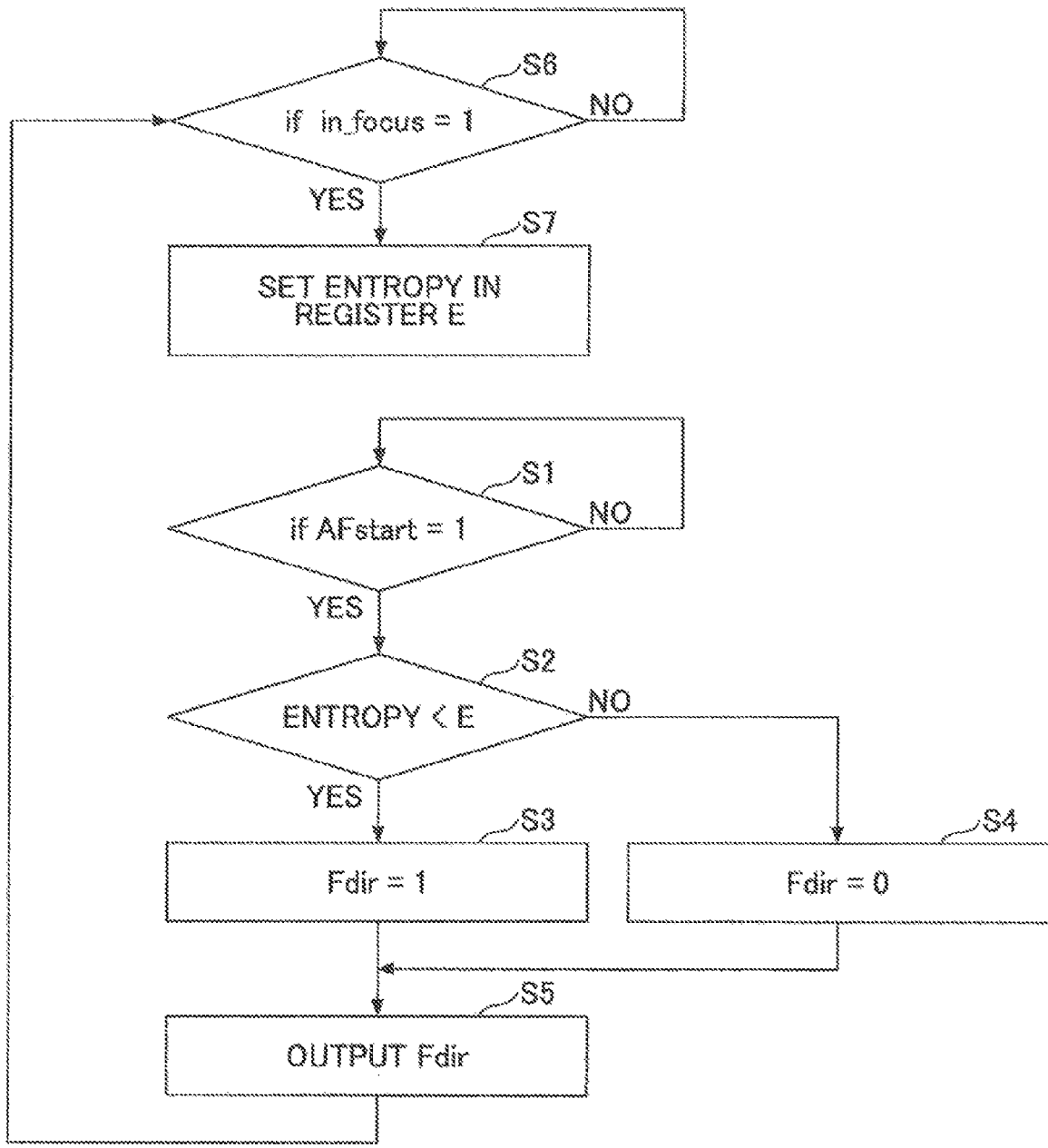
FIG. 13 is a flowchart illustrating the operation sequence of the AF-direction detecting unit.

FIG. 13 is a flowchart illustrating the operation sequence of the AF-direction detecting unit 15C. In step S1, the AF-direction detecting unit 15C monitors whether the AF activation timing signal AFstart is asserted at "1". Upon the AF activation timing signal AFstart becoming "1", a check is made in step S2 as to whether the current entropy value calculated from the current captured image is smaller than the entropy value E that has been calculated in the last auto-focus adjustment process and stored in the internal register. If the current entropy value is smaller than E, the procedure proceeds to step S3. Otherwise, the procedure proceeds to step S4.

In step S3, the focus movement direction signal Fdir is set equal to "1". In step S4, the focus movement direction signal Fdir is set equal to "0". In step S5, the AF-direction detecting unit 15C outputs the focus movement direction signal Fdir. This notifies the AF control unit 17A of the direction of focus shift that is to be used at the beginning of an auto-focus adjustment process. The AF control unit 17A produces the in_focus pulse signal upon achieving focus through the auto-focus adjustment process. In step S6, the AF-direction detecting unit 15C checks whether the in_focus signal is equal to "1" (indicative of a focused state). In response to the in_focus signal being "1", the procedure proceeds to step S7. In step S7, the current entropy value (i.e., the entropy value obtained in the focused state) is stored as the entropy value E in the internal register.

In the configuration illustrated in FIG. 11, the AF activation timing signal AFstart is generated based on a change in the contrast value as described above. In the configuration illustrated in FIG. 2, on the other hand, the AF activation timing signal AFstart is generated based on a change in the entropy value. Provision may be made such that these two configurations are combined to generate the AF activation timing signal AFstart in response to a contrast change exceeding a predetermined threshold value or an entropy change exceeding a predetermined threshold value.

Figure 14:
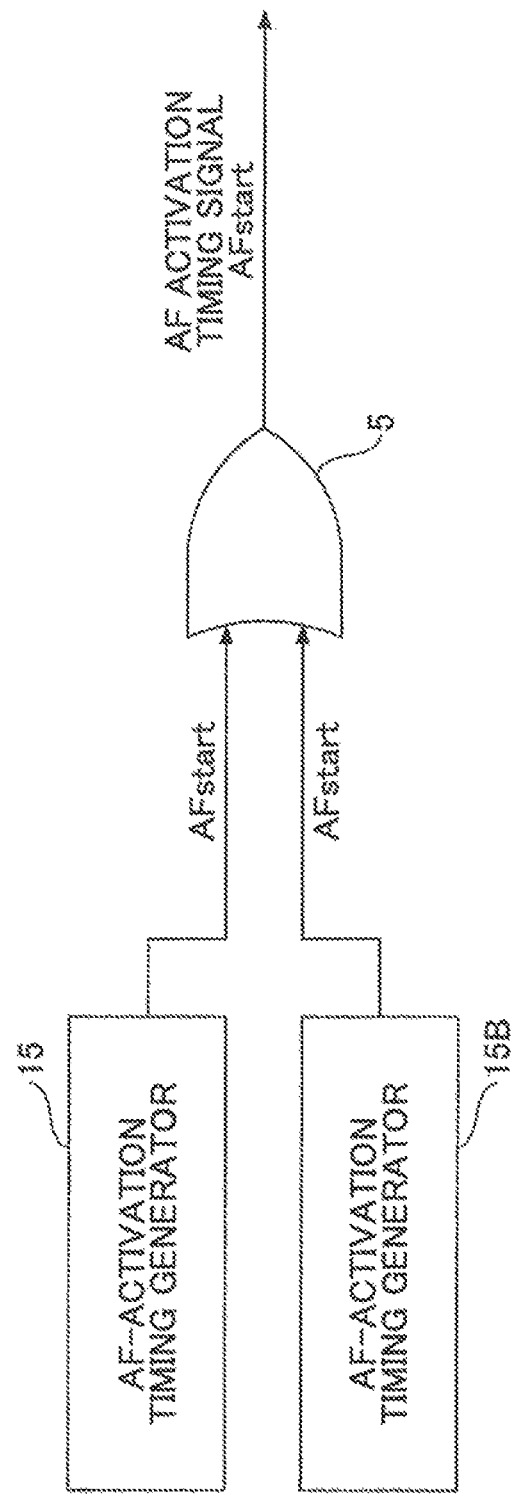
FIG. 14 is a drawing illustrating the configuration that generates an AF activation timing signal in response to a contrast change or an entropy change.

FIG. 14 is a drawing illustrating the configuration that generates the AF activation timing signal AFstart in response to a contrast change or an entropy change. In the configuration illustrated in FIG. 14, the AF-activation timing generator 15 generates an AF activation timing signal AFstart according to the operation of the flowchart of FIG. 3. Further, the AF-activation timing generator 15B generates an AF activation timing signal AFstart according to the operation of the flowchart of FIG. 12. An OR gate 5 performs an OR operation between these two AF activation timing signals AFstart to generate a consolidated AF activation timing signal AFstart. In the configuration illustrated in FIG. 11, the configuration illustrated in FIG. 14 may be provided in place of the AF-activation timing generator 15B, so that the AF activation timing signal AFstart output from the OR gate 5 is supplied to the AF control unit 17A.

Figure 15:
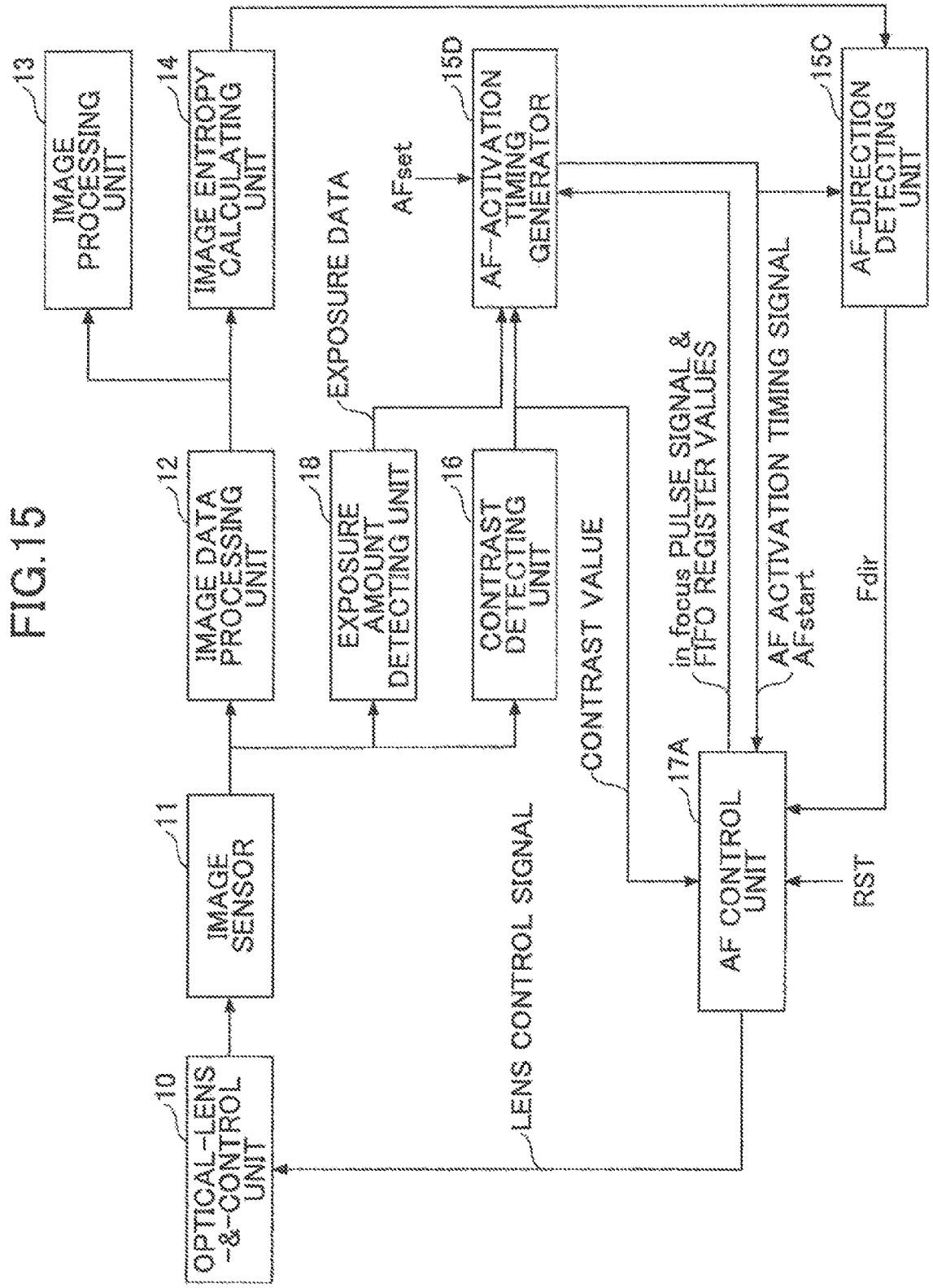
FIG. 15 is a drawing illustrating a variation of the imaging apparatus illustrated in FIG. 11.

FIG. 15 is a drawing illustrating a variation of the imaging apparatus illustrated in FIG. 11. In FIG. 15, the same elements as those of FIG. 11 are referred to by the same numerals, and a description thereof will be omitted. The imaging apparatus of FIG. 15 differs from the imaging apparatus of FIG. 11 in that an exposure amount detecting unit 18 is provided. Due to the provision of the exposure amount detecting unit 18, the AF-activation timing generator 15B of FIG. 11 is replaced by an AF-activation timing generator 15D in FIG. 15. The exposure amount detecting unit 18 calculates an exposure amount from the digital image data output from the image sensor 11, and supplies data indicative of the calculated exposure amount to the AF-activation timing generator 15D. The configuration and operation of the remaining part of the imaging apparatus are the same as or similar to the configuration and operation of the imaging apparatus illustrated in FIG. 11.

Figure 16:
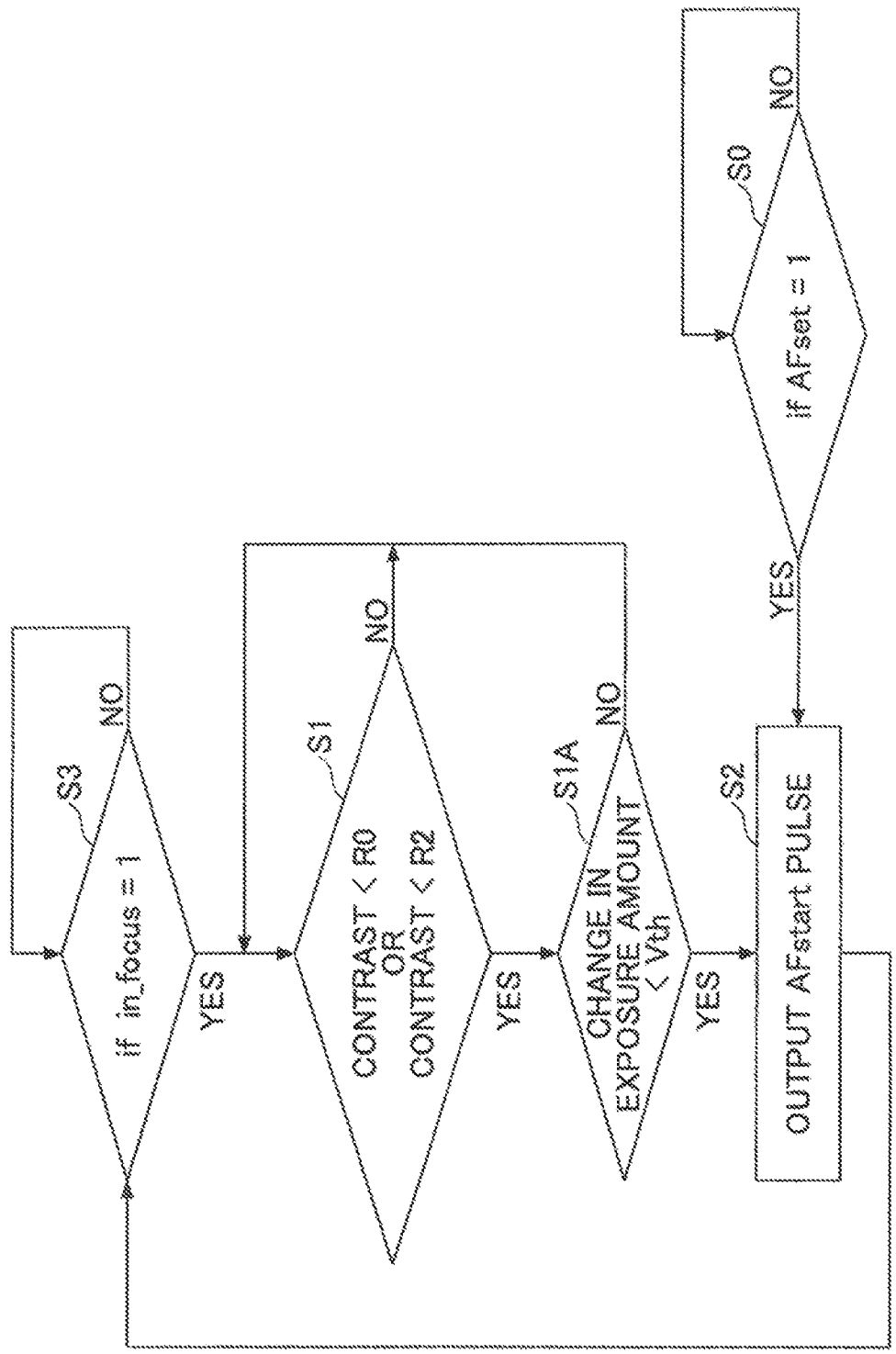
FIG. 16 is a flowchart illustrating an example of the operation of the AF-activation timing generator.

FIG. 16 is a flowchart illustrating an example of the operation of the AF-activation timing generator 15D. The operation illustrated in FIG. 16 differs from the operation of the AF-activation timing generator 15B illustrated in FIG. 12 in that step S1A is provided. The other steps of the operation are the same or similar between FIG. 12 and FIG. 16. In step S1A, a check is made, following the detection of a contrast drop, as to whether a change in exposure is smaller than a predetermined threshold value Vth. If the change in exposure is smaller than the predetermined threshold value Vth, the procedure proceeds to step S2 to perform an auto-focus adjustment process. If the change in exposure is no smaller than the predetermined threshold value Vth, the procedure proceeds to step S1 to repeat the procedure that starts with the checking of a current contrast value. This arrangement serves to avoid moving the focus position based on information about the direction of focus shift when the direction of focus shift is determined based on an entropy change caused by an exposure change. Namely, an auto-focus adjustment process is not performed when the direction of focus shift is determined in response to an exposure change.

Figure 17:
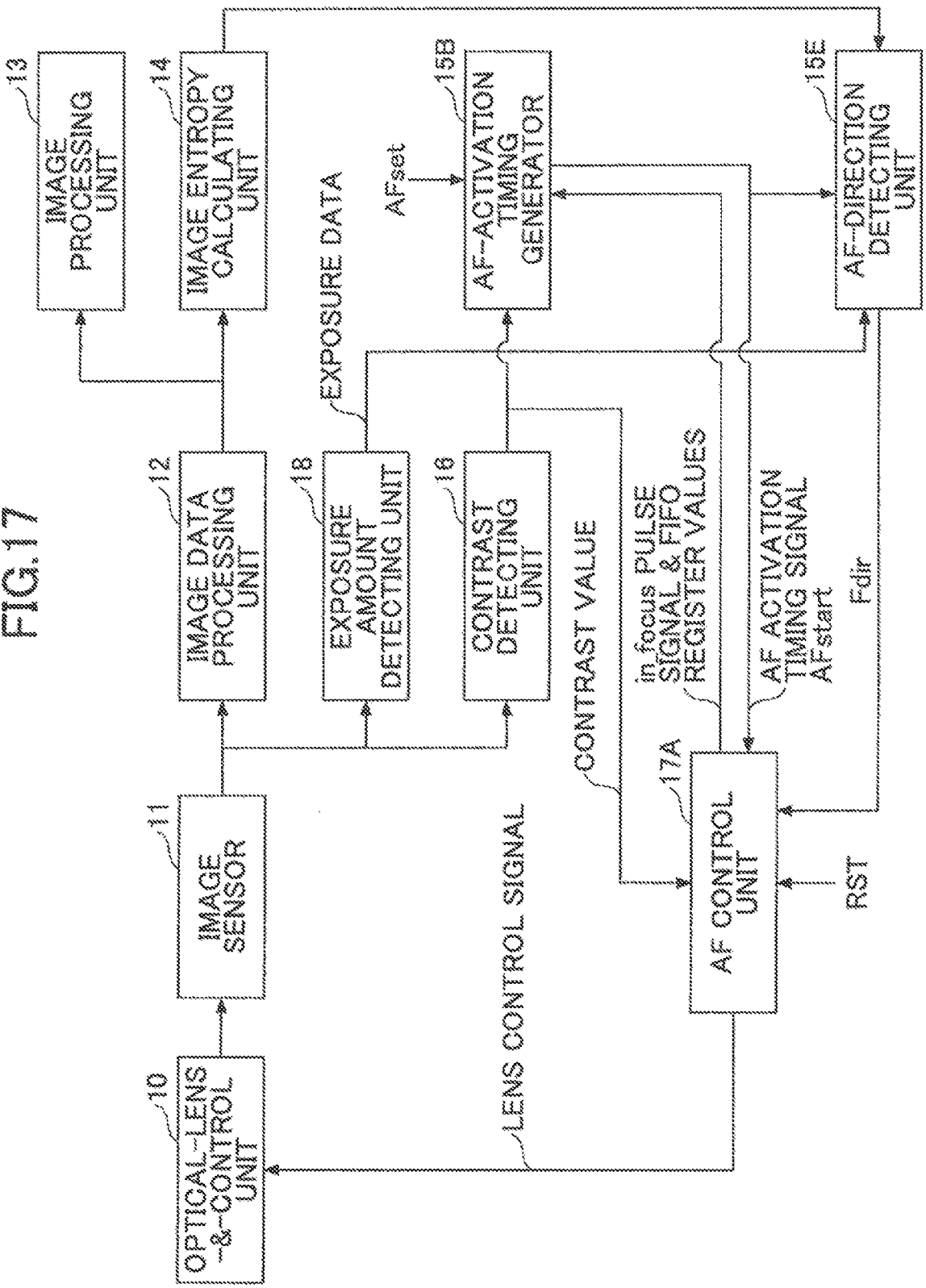
FIG. 17 is a drawing illustrating another variation of the imaging apparatus illustrated in FIG. 11.

FIG. 17 is a drawing illustrating another variation of the imaging apparatus illustrated in FIG. 11. In FIG. 17, the same elements as those of FIG. 11 are referred to by the same numerals, and a description thereof will be omitted. The imaging apparatus of FIG. 17 differs from the imaging apparatus of FIG. 11 in that an exposure amount detecting unit 18 is provided. Due to the provision of the exposure amount detecting unit 18, the AF-direction detecting unit 15C of FIG. 11 is replaced by an AF-direction detecting unit 15E in FIG. 17. The exposure amount detecting unit 18 calculates an exposure amount from the digital image data output from the image sensor 11, and supplies data indicative of the calculated exposure amount to the AF-direction detecting unit 15E. The configuration and operation of the remaining part of the imaging apparatus are the same as or similar to the configuration and operation of the imaging apparatus illustrated in FIG. 11.

Figure 18:
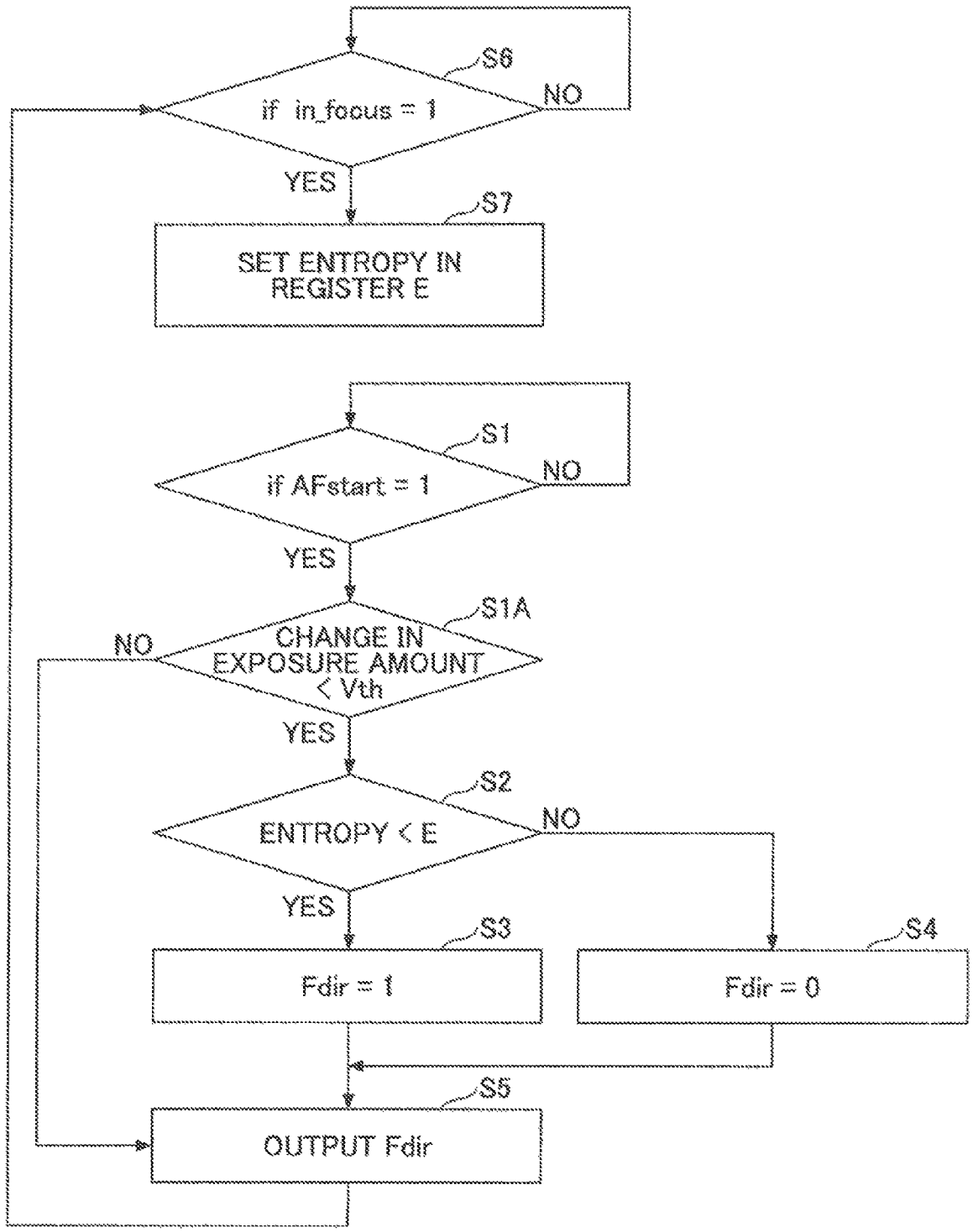
FIG. 18 is a flowchart illustrating an example of the operation of the AF-direction detecting unit.

FIG. 18 is a flowchart illustrating an example of the operation of the AF-direction detecting unit 15E. The operation illustrated in FIG. 18 differs from the operation of the AF-direction detecting unit 15C illustrated in FIG. 13 in that step S1A is provided. The other steps of the operation are the same or similar between FIG. 13 and FIG. 18. In step S1A, a check is made, after the AF activation timing signal AFstart becomes 1, as to whether a change in exposure is smaller than a predetermined threshold value Vth. If the change in exposure is smaller than the predetermined threshold value Vth, the procedure proceeds to step S2, so that the focus movement direction signal Fdir is determined based on entropy values in steps S2 through S4. If the change in exposure is no smaller than the predetermined threshold value Vth, the procedure skips the process of determining the focus movement direction signal Fdir, and proceeds to step S5, so that an auto-focus adjustment process is performed by using the current Fdir value. With this arrangement, when Fdir would be determined in response to an entropy change caused by an exposure change, a new auto-focus adjustment process is performed by using, as an initial direction, the direction of focus shift used in the immediately preceding auto-focus adjustment process. Namely, as in the case of FIG. 10, an auto-focus adjustment process starts with the action to move the focus position in the same direction as the direction of focus shift used in the immediately preceding focus adjustment process.

Figure 19:
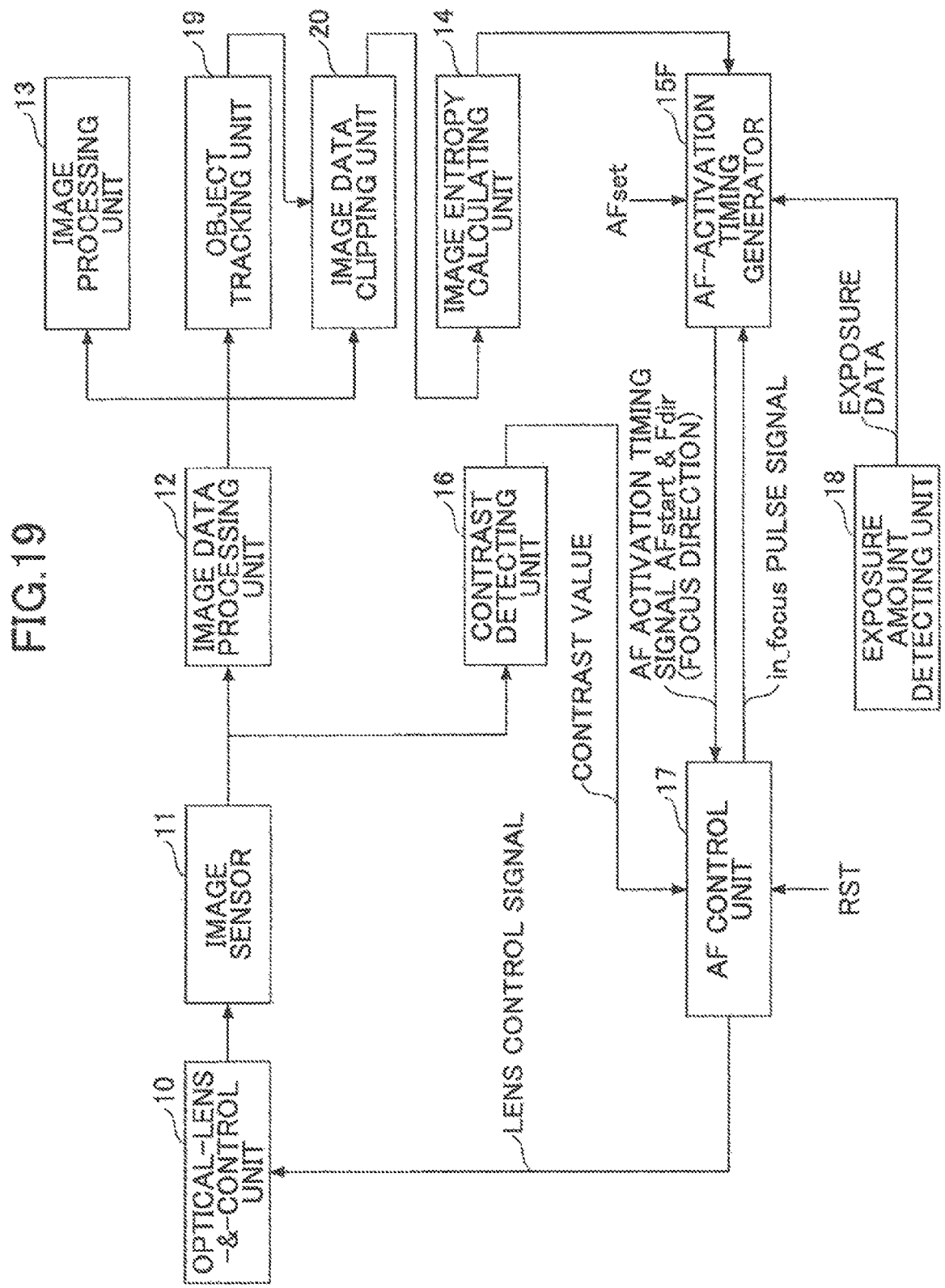
FIG. 19 is a drawing illustrating a variation of the imaging apparatus illustrated in FIG. 2.

FIG. 19 is a drawing illustrating a variation of the imaging apparatus illustrated in FIG. 2. In FIG. 19, the same elements as those of FIG. 2 are referred to by the same numerals, and a description thereof will be omitted. In the configuration illustrated in FIG. 19, an exposure amount detecting unit 18, an object tracking unit 19, and an image data clipping unit 20 are provided in addition to the configuration illustrated in FIG. 2. The exposure amount detecting unit 18 calculates an exposure amount from the digital image data output from the image sensor 11, for example, and supplies data indicative of the calculated exposure amount to an AF-activation timing generator 15F. The exposure amount detecting unit 18 may calculate an exposure amount based on the digital image data output from the image data processing unit 12 rather than based on the digital image data output from the image sensor 11. The AF-activation timing generator 15F takes into account the exposure amount data to determine the timing at which the auto-focus adjustment process starts.

The object tracking unit 19 tracks a camera-captured object existing in captured images based on digital image data output from the image data processing unit 12. The tracking of the camera-captured object may be performed by detecting motion flow from the gradient of pixel values, by detecting motion vectors from image correlations, by using color information as clues, etc. Information about the position of the object in the image screen detected by the object tracking unit 19 (e.g., information about the position of a detection frame) is supplied to the image data clipping unit 20. Based on the information about the position of the object in the image screen, the image data clipping unit 20 clips image data having the area defined by the detection frame, and supplies the clipped image to the image entropy calculating unit 14. The image entropy calculating unit 14 uses the clipped image occupying part of the entire screen supplied from the image data clipping unit 20 to calculate entropy (i.e., indicator of randomness). The detection frame for clipping image data may be a fixed size frame chat surrounds the tracking-target object.

Figure 20:
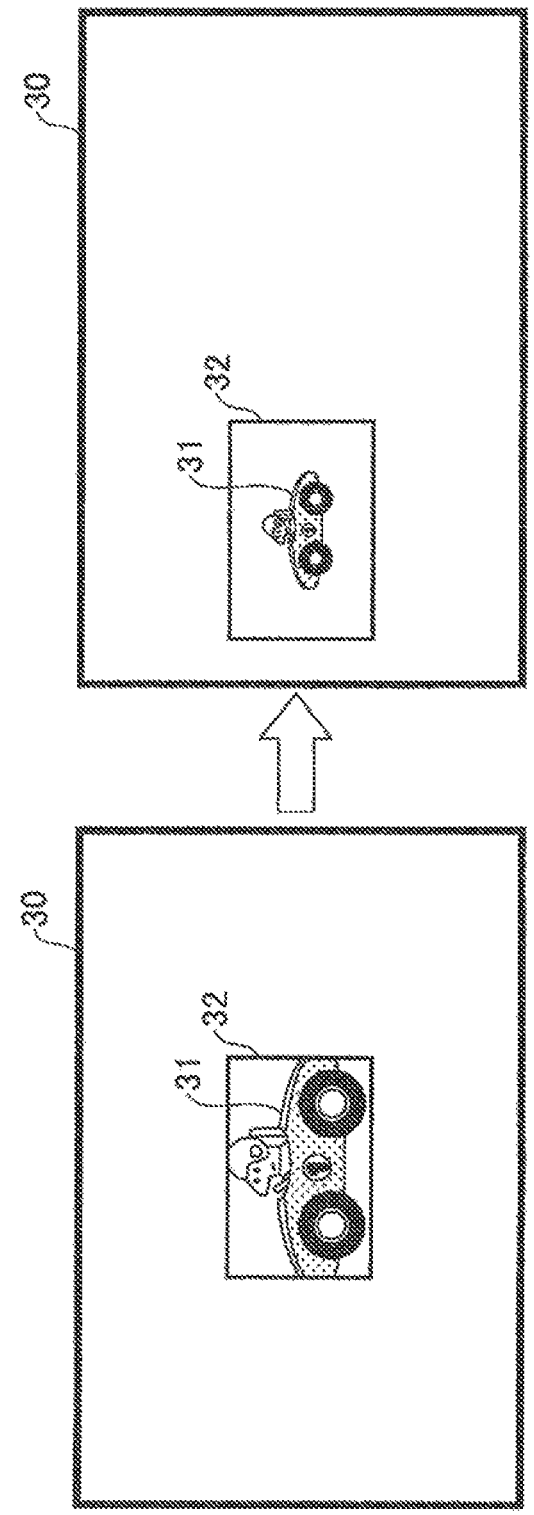
FIG. 20 is a drawing illustrating the relationship between a tracking-target object and a detection frame.

FIG. 20 is a drawing illustrating the relationship between a tracking-target object and a detection frame. As illustrated in FIG. 20, a detection frame 32 is placed for a tracking-target object 31. The size of the detection frame 32 is constant and does not change even when the distance between the tracking-target object 31 and the imaging apparatus changes. Namely, the detection frame 32 may be set for the tracking-target object 31 in an image screen 30 as illustrated on the left-hand side in FIG. 20, and, then, the size of the detection frame 32 remains the same even when the tracking-target object 31 goes farther away to appear smaller as illustrated on the right-hand side in FIG. 20. With this arrangement, the area that the tracking-target object 31 occupies in the detection frame 32 increases as the tracking-target object 31 comes closer to the imaging apparatus. This decreases entropy. Conversely, the area that the tracking-target object 31 occupies in the detection frame 32 decreases as the tracking-target object 31 goes farther away from the imaging apparatus. This increases entropy. With this arrangement, thus, the size of an image for which entropy is calculated is reduced, thereby achieving an efficient process.

Figure 21:
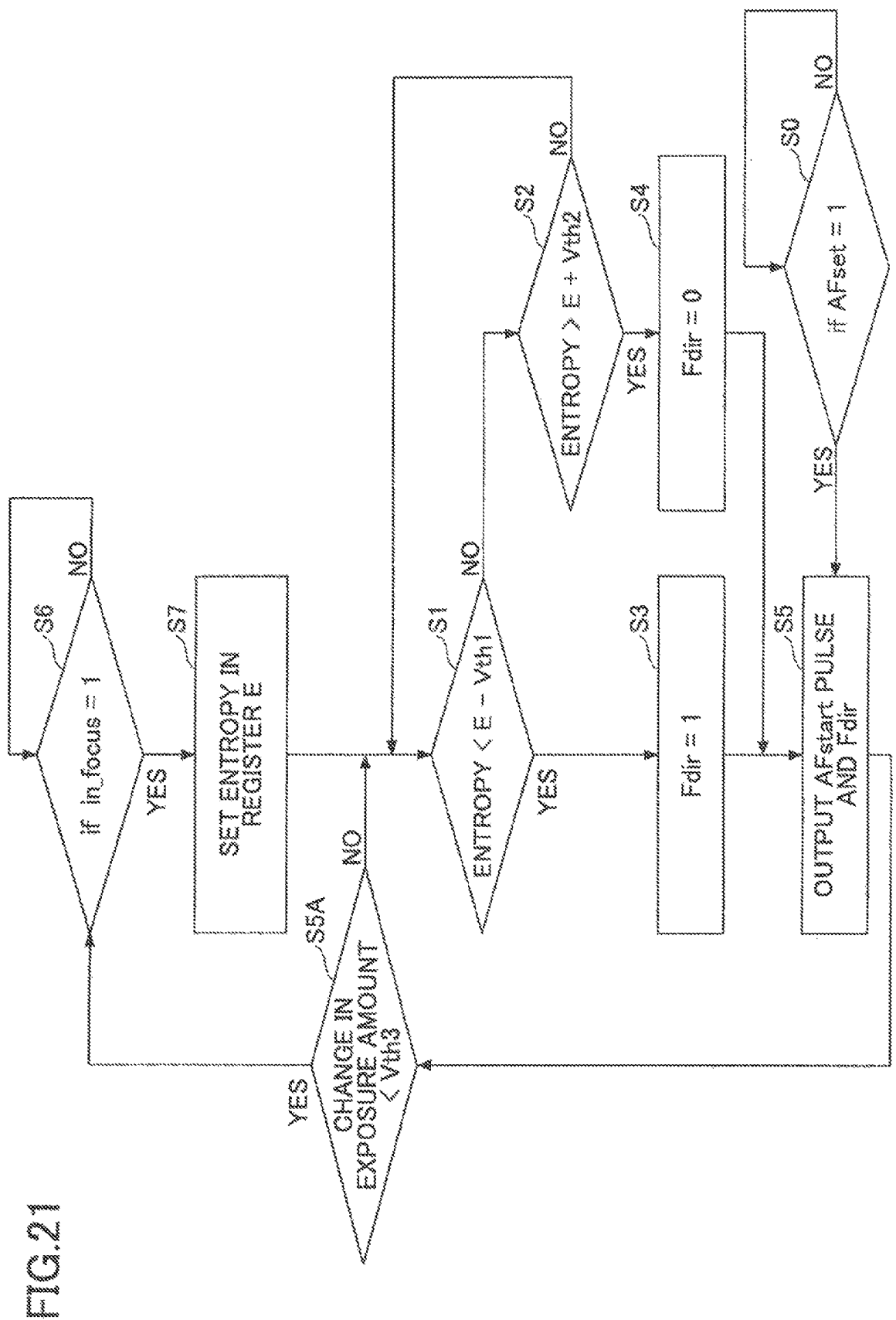
FIG. 21 is a flowchart illustrating an example of the operation of the AF-activation timing generator.

FIG. 21 is a flowchart illustrating an example of the operation of the AF-activation timing generator 15F. The operation illustrated in FIG. 21 differs from the operation of the AF-activation timing generator 15 illustrated in FIG. 3 in that step S5A is additionally provided. The other steps of the operation are the same or similar between FIG. 3 and FIG. 21. In step S5A, a check is made, following the outputting of AFstart and Fdir from the AF-activation timing generator 15F, as to whether a change in exposure is smaller than a predetermined threshold value Vth3. If the change in exposure is smaller than the predetermined threshold value Vth3, the procedure performs a check of the in_focus signal in step S6, followed by proceeding to step S7. In step S7, the current entropy value (i.e., the entropy value obtained in the focused state) is stored as the entropy value E in the internal register. If the change in exposure is no smaller than the predetermined threshold value Vth3, the procedure proceeds to step S1, in which the current entropy value is monitored.

In the flowchart of FIG. 21, an exposure amount is taken into consideration. However, the AF control unit 17 performs an auto-focus adjustment process regardless of whether a change in exposure is present. Even if this auto-focus adjustment process starts with a wrong direction of initial movement, the auto-focus adjustment process as illustrated in FIG. 6 will come to an end after detecting the focused state. However, the entropy value detected in an overexposure condition or underexposure condition immediately following a significant change in exposure is not a proper value for the purpose of detecting a distance to the camera subject. If such an entropy value is stored in the internal register as an update value, another needless auto-focus adjustment process may be performed when a proper exposure condition is regained. This is because an entropy change is detected again due to the return to the proper exposure condition. In the flowchart of FIG. 21, therefore, the meaningless entropy value obtained in an overexposure or underexposure condition is not stored in the internal register. That is, the existing values in the internal register are maintained as they are.

Figure 22:
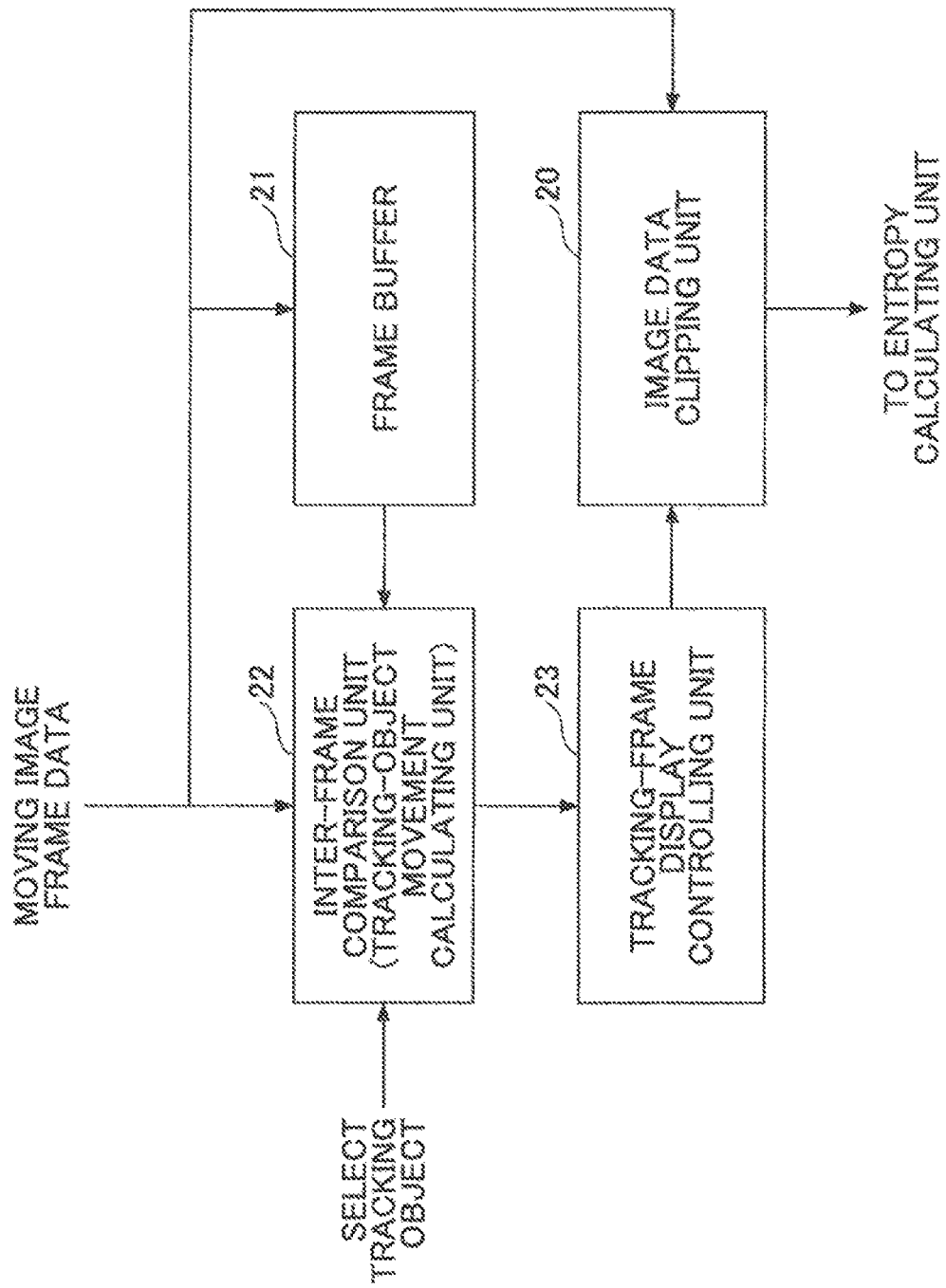
FIG. 22 is a block diagram illustrating an example of the configuration of relevant portions including an object tracking unit and an image data clipping unit.

FIG. 22 is a block diagram illustrating an example of the configuration of relevant portions including the object tracking unit 19 and the image data clipping unit 20. The configuration illustrated in FIG. 22 includes a frame buffer 21, an inter-frame comparison unit 22, a tracking-frame display controlling unit 23, and the image data clipping unit 20. The inter-frame comparison unit 22 and the tracking-frame display controlling unit 23 may correspond to the object tracking unit 19.

Figure 23:
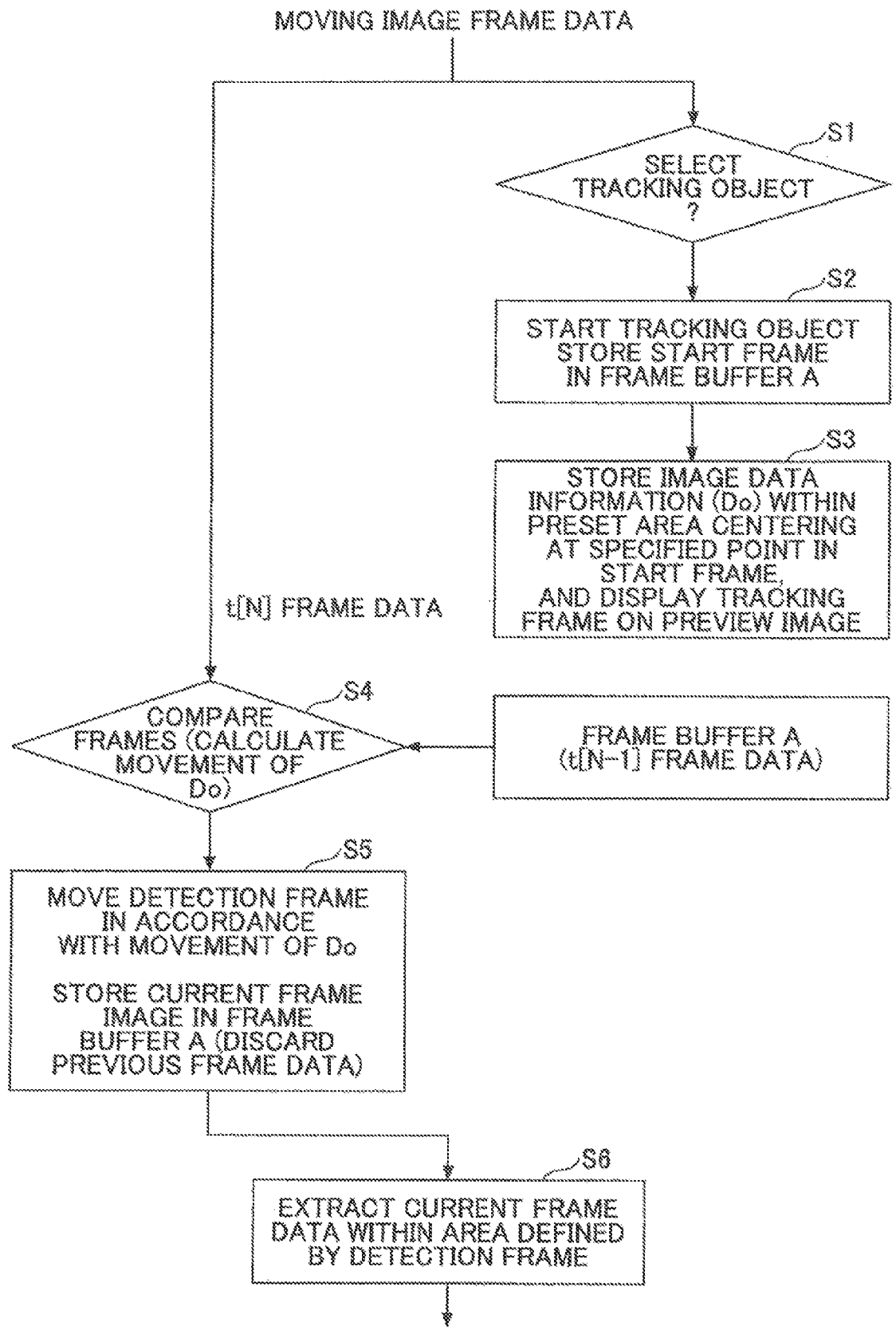
FIG. 23 is a flowchart illustrating an example of the operations performed by the object tracking unit and the image data clipping unit.

FIG. 23 is a flowchart illustrating an example of the operations performed by the object tracking unit and the image data clipping unit. When moving picture frame data is supplied, a tracking target is selected in step S1. For example, an image within an area specified by a camera operator on the displayed screen of the imaging apparatus may be selected as the tracking target. Alternatively, a face image portion or the like detected by a face image process may be selected as the tracking target. In step S2, an object tracking process starts, and the first frame is stored in a frame buffer A (i.e., the frame buffer 21 illustrated in FIG. 22). In step S3, image data information (i.e., partial image Do) within a preset area centering at the specified point in the first frame is stored, followed by displaying a tracking frame (e.g., the detection frame 32 illustrated in FIG. 20) for indicating the preset area on the display screen of the imaging apparatus. Here, the inter-frame comparison unit selects the tracking target, and stores the partial image Do. Further, the tracking-frame display controlling unit 23 displays the tracking frame on the display screen.

When subsequent moving image frame data is supplied, the inter-frame comparison unit 22 compares the current frame with the frame stored in the frame buffer A, thereby calculating a shift amount of the partial image Do. In step S5, the position of the detection frame is moved according to the calculated shift amount of the partial image Do, and the digital image data of the current frame is stored in the frame buffer A in such a manner as to overwrite the digital image data of the preceding frame. The tracking-frame display controlling unit 23 performs the process of moving the detection frame. In step S6, the image data clipping unit 20 clips current-frame digital image data within the area defined by the detection frame, and supplies the clipped image data to the image entropy calculating unit 14.

According to at least one embodiment of the present disclosures, the direction of focus shift is determined in response to a change in the indicator of randomness of pixel values in the captured image, so that the focus position is moved in a proper direction upon the occurrence of focus error.

The present invention is applicable to both a still camera and a video camera.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A circuit for auto-focus adjustment, comprising:
   a calculating unit configured to calculate an indicator indicative of randomness of pixel values in a captured image;
   a direction determining unit configured to compare a first value of the indicator calculated by the calculating unit in a preceding focus adjustment process with a second value of the indicator calculated by the calculating unit after the calculation of the first value, thereby to determine a direction of focus shift in response to a result of the comparison; and
   a control unit configured to start a focus adjustment process by which a focus position is first moved in the direction of focus shift determined by the direction determining unit.

2. The circuit as claimed in claim 1, wherein the indicator is image entropy, and wherein the direction determining unit selects a first direction as the direction of focus shift upon detecting the second value larger than the first value, and selects a second direction as the direction of focus shift upon detecting the second value smaller than the first value, the first direction being a direction in which the focus position moves away from a lens, and the second direction being a direction in which the focus position moves closer to the lens.

3. The circuit as claimed in claim 1, further comprising:
   a timing indicating unit configured to request the control unit to start the focus adjustment process upon detecting a focus error; and
   an exposure amount detecting unit configured to detect an exposure amount of the captured image,
   wherein the control unit refrains from moving the focus position based on information about the direction of focus shift determined by the direction determining unit when the timing indicating unit requests to start the focus adjustment process and a change in the exposure amount detected by the exposure amount detecting unit is larger than a predetermined threshold value.

4. The circuit as claimed in claim 3, wherein the control unit starts the focus adjustment process by which the focus position is first moved in the same direction as a direction of focus shift used in the preceding focus adjustment process when the timing indicating unit requests to start the focus adjustment process and a change in the exposure amount detected by the exposure amount detecting unit is larger than a predetermined threshold value.

5. The circuit as claimed in claim 3, wherein the control unit refrains from performing the focus adjustment process when the timing indicating unit requests to start the focus adjustment process and a change in the exposure amount detected by the exposure amount detecting unit is larger than a predetermined threshold value.

6. The circuit as claimed in claim 1, wherein the control unit starts the focus adjustment process upon detecting that a value of the indicator calculated by the calculating unit deviates from the first value by more than a predetermined threshold value.

7. The circuit as claimed in claim 1, wherein the calculating unit calculates the indicator with respect to a partial area of an entire image screen.

8. The circuit as claimed in claim 7, further comprising an object tracking unit configured to track an object in captured images, and the partial area of the entire image screen is an area within a frame having a fixed size and surrounding the object, the frame being set by the object tracking unit.

9. The circuit as claimed in claim 1, further comprising a contrast detecting unit configured to detect a contrast value of the captured image, and the control unit starts the focus adjustment process in response to a change in the contrast value.

10. The circuit as claimed in claim 9, wherein the control unit starts the focus adjustment process by which the focus position is first moved in the direction of focus shift determined by the direction determining unit, and thereafter controls a direction of focus shift based on a change in the contrast value after the first move of the focus position by the focus adjustment process.

11. An imaging apparatus, comprising:
    a lens;
    an imaging device;
    a calculating unit configured to calculate an indicator indicative of randomness of pixel values in an image captured by the imaging device;
    a direction determining unit configured to compare a first value of the indicator calculated by the calculating unit in a preceding focus adjustment process with a second value of the indicator calculated by the calculating unit after the calculation of the first value, thereby to determine a direction of positional shift of the lens in response to a result of the comparison; and a control unit configured to start a focus adjustment process by which the lens is first moved in the direction of positional shift determined by the direction determining unit.

12. A method for auto-focus adjustment, comprising:

calculating an indicator indicative of randomness of pixel values in a captured image;

comparing a first value of the indicator calculated in a preceding focus adjustment process with a second value of the indicator calculated after the calculation of the first value;

determining a direction of focus shift in response to a result of the comparison; and starting a focus adjustment process by which a focus position is first moved in the determined direction of focus shift.

13. The method as claimed in claim 12, wherein the indicator is image entropy, and wherein a first direction is selected as the direction of focus shift upon detecting the second value larger than the first value, and a second direction is selected as the direction of focus shift upon detecting the second value smaller than the first value, the first direction being a direction in which the focus position moves away from a lens, and the second direction being a direction in which the focus position moves closer to the lens.

14. The method as claimed in claim 12, further comprising:

generating a start request requesting to start the focus adjustment process upon detecting a focus error; and detecting an exposure amount of the captured image, wherein the focus adjustment process is started by moving the focus position in the determined direction of focus shift when there is the start request and a change in the detected exposure amount is smaller than a predetermined threshold value, and wherein the focus adjustment process is started by moving the focus position in the same direction as a direction of focus shift used in the preceding focus adjustment process when there is the start request and a change in the detected exposure amount is larger than the predetermined threshold value.

15. The method as claimed in claim 12, wherein the calculating an indicator of randomness includes:

selecting a tracking object in the captured image;

setting a detection frame that has a fixed size and surrounds the selected tracking object; and calculating the indicator of randomness with respect to a partial image of the captured image, the partial image being within the detection frame.

\* \* \* \* \*